United States Patent
Yeh et al.

(10) Patent No.: US 11,221,658 B2
(45) Date of Patent: Jan. 11, 2022

(54) MULTI-PORT POWER DELIVERY SYSTEM AND RELATED CONTROL METHOD

(71) Applicant: Alpha and Omega Semiconductor (Cayman), Ltd., Grand Cayman (KY)

(72) Inventors: Pao-Yao Yeh, Hsinchu (TW); Yu-Ming Chen, Hsinchu (TW); Jung-Pei Cheng, Hsinchu (TW); Hsiang-Chung Chang, Zhubei (TW)

(73) Assignee: ALPHA AND OMEGA SEMICONDUCTOR (CAYMAN), LTD., Grand Cayman (KY)

(*) Notice: Subject to any disclaimer, the term of this patent is extended or adjusted under 35 U.S.C. 154(b) by 8 days.

(21) Appl. No.: 16/745,108

(22) Filed: Jan. 16, 2020

(65) Prior Publication Data

US 2021/0223838 A1  Jul. 22, 2021

(51) Int. Cl.
| | |
|---|---|
| *G06F 1/26* | (2006.01) |
| *H02J 7/00* | (2006.01) |
| *H02M 3/24* | (2006.01) |
| *H02M 1/44* | (2007.01) |
| *G06F 13/42* | (2006.01) |
| *G06F 13/40* | (2006.01) |
| *G06F 13/20* | (2006.01) |
| *H02M 1/00* | (2006.01) |

(52) U.S. Cl.
CPC .............. *G06F 1/266* (2013.01); *G06F 13/20* (2013.01); *G06F 13/4022* (2013.01); *G06F 13/4282* (2013.01); *H02J 7/0045* (2013.01); *H02M 1/44* (2013.01); *H02M 3/24* (2013.01); *G06F 2213/0042* (2013.01); *H02M 1/007* (2021.05)

(58) Field of Classification Search
CPC .. G06F 1/266; G06F 1/263; G06F 2213/0042; G06F 13/385; G06F 13/4282; G06F 11/3051
USPC ........................................................... 713/300
See application file for complete search history.

(56) References Cited

U.S. PATENT DOCUMENTS

| | | | | |
|---|---|---|---|---|
| 5,799,196 A | * | 8/1998 | Flannery .................... | G06F 1/26 713/320 |
| 7,043,646 B2 | * | 5/2006 | Enami ...................... | G06F 1/266 713/300 |
| 8,107,243 B2 | * | 1/2012 | Guccione .................. | G06F 1/26 361/728 |
| 10,712,803 B2 | * | 7/2020 | Suganuma ............ | G06F 13/362 |

(Continued)

*Primary Examiner* — Faisal M Zaman
(74) *Attorney, Agent, or Firm* — Chen-Chi Lin

(57) ABSTRACT

A multi-port power delivery system includes a first universal serial bus (USB) port, a second USB port, a first power conversion unit, a second power conversion unit, a power delivery control circuit and a switch circuit. The first USB port is configured to output power delivered to a first power path. The second USB port is configured to output power delivered to a second power path. The first power conversion unit has a first output terminal coupled to the first power path. The second power conversion unit has a second output terminal coupled to the second power path. The power delivery control circuit generates a switch control signal according to first connection information on the first USB port and second connection information on the second USB port. The switch circuit selectively couples the first output terminal to the second output terminal according to the switch control signal.

18 Claims, 17 Drawing Sheets

(56) References Cited

U.S. PATENT DOCUMENTS

| | | | |
|---|---|---|---|
| 2003/0070103 A1* | 4/2003 | Kim | G06F 1/266 |
| | | | 713/300 |
| 2003/0110403 A1* | 6/2003 | Crutchfield | G06F 1/266 |
| | | | 713/300 |
| 2009/0210734 A1* | 8/2009 | Schramm | G06F 13/385 |
| | | | 713/324 |
| 2014/0091623 A1* | 4/2014 | Shippy | H02J 7/0068 |
| | | | 307/31 |
| 2015/0160705 A1* | 6/2015 | Chen | H02J 1/10 |
| | | | 713/300 |
| 2016/0173678 A1* | 6/2016 | DeCamp | G06F 1/266 |
| | | | 455/557 |
| 2016/0219664 A1* | 7/2016 | Ellenberger | H05B 45/10 |
| 2017/0005494 A1* | 1/2017 | Li | G06F 1/263 |
| 2017/0185125 A1* | 6/2017 | Lin | G06F 1/266 |
| 2017/0249166 A1* | 8/2017 | Nisarga | G06F 1/3253 |
| 2017/0364463 A1* | 12/2017 | Chen | G06F 13/385 |
| 2018/0034316 A1* | 2/2018 | Ret | G01R 31/3835 |
| 2018/0269707 A1* | 9/2018 | Dai | H02J 7/0031 |
| 2018/0341309 A1* | 11/2018 | Sporck | G06F 13/4295 |
| 2019/0050360 A1* | 2/2019 | Truong | G06F 13/4282 |
| 2019/0115833 A1* | 4/2019 | Belet | G01R 31/40 |
| 2019/0138072 A1* | 5/2019 | Kuroi | G06F 1/305 |
| 2019/0236037 A1* | 8/2019 | Sugumar | G06F 1/266 |
| 2019/0238705 A1* | 8/2019 | Shimamura | G06F 1/28 |
| 2020/0083740 A1* | 3/2020 | Sultenfuss | G06F 1/263 |
| 2020/0091758 A1* | 3/2020 | Jahan | H02J 7/00 |
| 2020/0183471 A1* | 6/2020 | Liu | G06F 1/266 |
| 2021/0036533 A1* | 2/2021 | Sporck | H02J 7/0068 |

\* cited by examiner

MULTI-PORT POWER DELIVERY SYSTEM AND RELATED CONTROL METHOD

FIELD OF THE INVENTION

The present disclosure relates to power delivery and, more particularly, to a multi-port power delivery system capable of delivering power supplied by multiple power supply units to one of multiple ports thereof, and a control method of a multi-port power delivery system.

BACKGROUND OF THE INVENTION

Although a universal serial bus (USB) was designed mainly for data communication, a USB port has become a ubiquitous power socket for many devices such as mobile phones, laptop computers, tablet computers, media playback devices or other types of portable devices. The USB Type-C (USB-C) connection is increasingly popular due to its high speed data transfer and high power delivery capability. With the introduction of Power Delivery (PD), the USB-C connection can broaden the range of USB usability. For example, the USB-C connection supporting PD can support power levels ranging from the 5 volts at 500 milliamps up to 20 volts at 5 amps.

SUMMARY OF THE INVENTION

The described embodiments provide a multi-port power delivery system capable of delivering power supplied by multiple power supply units to one of multiple ports thereof, and a control method of a multi-port power delivery system.

Some embodiments described herein include a multi-port power delivery system. The multi-port power delivery system includes a first universal serial bus (USB) port, a second USB port, a first power conversion unit, a second power conversion unit, a power delivery control circuit and a switch circuit. The first USB port is configured to output power delivered to a first power path. The second USB port is configured to output power delivered to a second power path different from the first power path. The first power conversion unit has a first output terminal coupled to the first power path. The second power conversion unit has a second output terminal coupled to the second power path. The power delivery control circuit, coupled to the first USB port and the second USB port, is configured to generate a switch control signal according to first connection information on the first USB port and second connection information on the second USB port. The switch circuit is configured to selectively couple the first output terminal to the second output terminal according to the switch control signal.

Some embodiments described herein include a control method of a multi-port power delivery system. The control method includes: detecting a first universal serial bus (USB) port of the multi-port power delivery system to obtain first connection information on the first USB port, the first USB port being configured to output power delivered to a first power path, the first power path being coupled to a first output terminal of a first power conversion unit in the multi-port power delivery system; detecting a second USB port of the multi-port power delivery system to obtain second connection information on the second USB port, the second USB port being configured to output power delivered to a second power path different from the first power path, the second power path being coupled to a second output terminal of a second power conversion unit in the multi-port power delivery system; and when the first connection information indicates that the first USB port is an attached charging port, and the second connection information indicates that the second USB port is a detached charging port, coupling the first output terminal to the second output terminal, turning on the first power path and turning off the second power path.

BRIEF DESCRIPTION OF THE DRAWINGS

Aspects of the present disclosure are readily understood from the following detailed description when read with the accompanying figures. It should be noted that various features may not be drawn to scale. In fact, the dimensions of the various features may be arbitrarily increased or reduced for clarity of discussion.

DETAILED DESCRIPTION OF THE INVENTION

Figure 1:
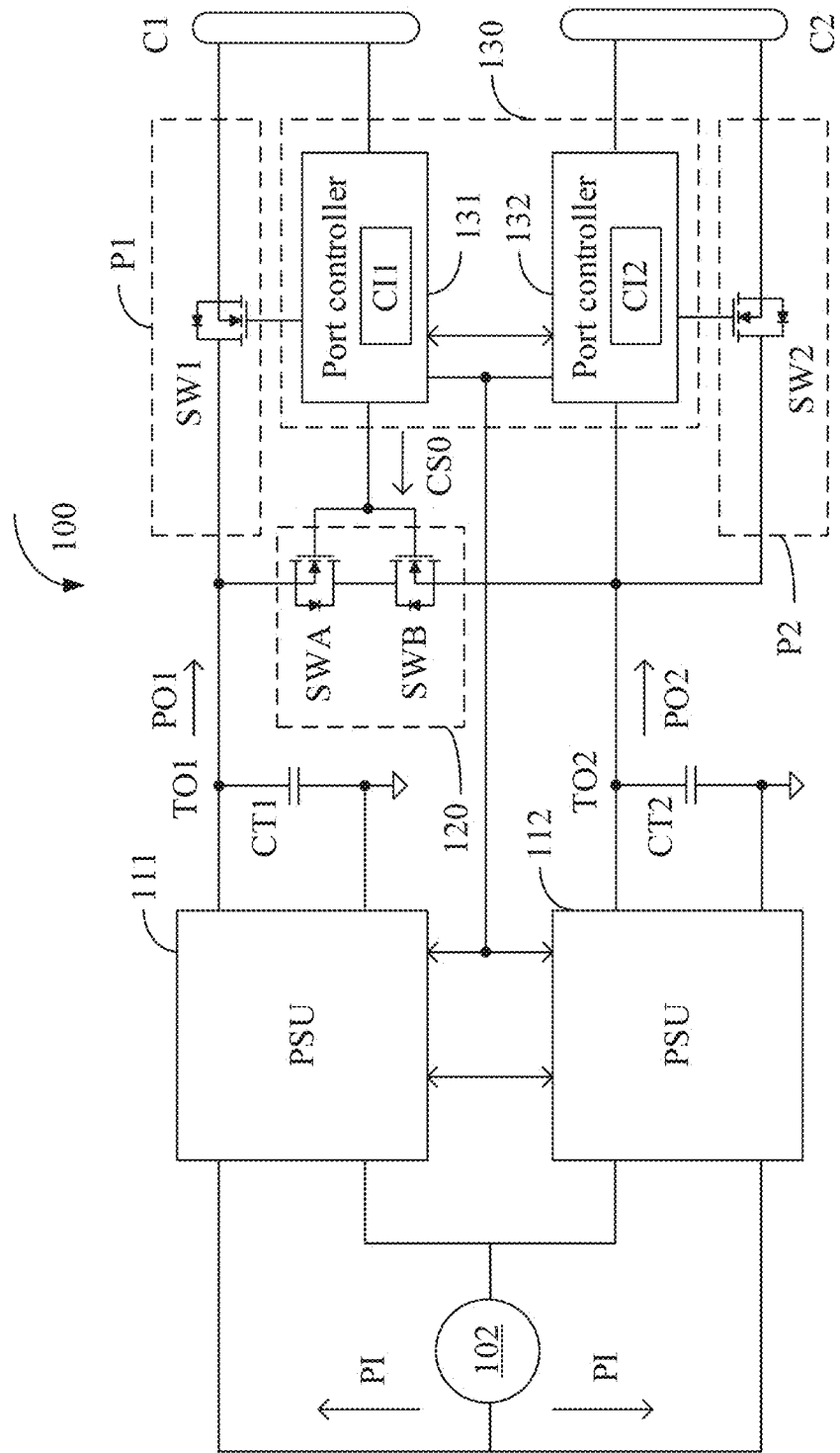
FIG. 1 illustrates an exemplary multi-port power delivery system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or intervening elements may be present. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

A USB-C PD charger, i.e. a USB Type-C charger supporting Power Delivery, may have multiple charging ports to charge more than one electronic device simultaneously. Such multi-port USB-C PD charger usually utilizes multiple direct-current to direct-current converters (DC/DC converters) which are dedicated to the multiple charging ports respectively, resulting in reduced power efficiency and increased costs. For example, a dual-port USB-C PD charger capable of delivering a maximum power output of 60 watts may utilize an alternating-current to direct-current converter (AC/DC converter) and two DC/DC converters, each of which is designed to deliver a power output up to 60 watts. It is worth noting that as AC/DC conversion efficiency is less than DC/DC conversion efficiency, the AC/DC converter is usually designed to be capable of providing a power output more than 60 watts. These three converters capable of the delivering the maximum power output would occupy a large circuit area, and reduce overall system efficiency. Additionally, in an operating scenario where two USB-C ports of the dual-port USB-C PD charger are attached to two electronic devices respectively, each USB-C port is configured to output half of the maximum power output at most. This is not cost-effective since each USB-C port is coupled to a DC/DC converter capable of providing the maximum total power output.

The present disclosure describes exemplary multi-port power delivery systems capable of delivering power supplied by multiple power supply units (PSUs) to one of multiple ports thereof. For example, a switch circuit is disposed between respective output terminals of the power supply units. With the aid of the switch circuit, power supplied by more than one PSU can be delivered to a single port to provide a specified maximum total power output. As a result, a maximum power output of at least one PSU of an exemplary multi-port power delivery system can be less than the specified maximum total power output. The exemplary multi-port power delivery systems can therefore have increased overall system efficiency, a reduced occupied circuit area and a cost-effective design. The present disclosure further describes exemplary control methods of multi-port power delivery systems. Further description is provided below.

FIG. 1 illustrates an exemplary multi-port power delivery system in accordance with some embodiments of the present disclosure. The multi-port power delivery system 100 can be configured to charge one or more electronic devices (not shown in FIG. 1) in response to power supplied by a power source 102. In the present embodiment, the multi-port power delivery system 100 can implemented as at least a portion of a multi-port universal serial bus (USB) charger such as a multi-port USB-C charger. In some embodiments, the multi-port power delivery system 100 can implemented as at least a portion of other types of multi-port USB chargers without departing from the scope of the present disclosure.

The multi-port power delivery system 100 may include a plurality of USB ports C1 and C2, a plurality of power supply units (PSUs) 111 and 112, a switch circuit 120 and a power delivery control circuit 130. The USB port C1 is configured to output power delivered through a power path P1, and the USB port C2 is configured to output power delivered through a power path P2 different from the power path P1. Each of the USB ports C1 and C2 can be referred to as a USB connector. In the present embodiment, each of the USB ports C1 and C2 can be implemented as a USB-C port or a USB-C connector. In some embodiments, at least one of the USB ports C1 and C2 can be implemented using a same type of USB ports different from a USB-C port without departing from the scope of the present disclosure.

The PSU 111, having an output terminal TO1 coupled to the power path P1, is configured to generate a power output PO1 at the output terminal TO1 according to a power input PI supplied by the power source 102. By way of example but not limitation, the PSU 111 can be implemented as an AC/DC converter configured to convert an AC power input, e.g. the power input PI, to a DC power output, e.g. the power output PO1. As another example, the PSU 111 can be implemented as a DC/DC converter configured to convert a DC power input, e.g. the power input PI, to a DC output, e.g. the power output PO1. As still another example, the PSU 111 can be implemented as other types of power converters each having a single output. In the present embodiment, the output terminal TO1 can be coupled to a capacitor CT1, which is configured to smooth ripples in the power output PO1.

The PSU 112, having an output terminal TO2 coupled to the power path P2, is configured to generate a power output PO2 at the output terminal TO2 according to the power input PI supplied by the power source 102. Similarly, the PSU 112 can be implemented as an AC/DC converter, a DC/DC converter, or a power converter having a single output. The output terminal TO2 can be coupled to a capacitor CT2, which is configured to smooth ripples in the power output PO2. In the present embodiment, the power outputs PO1 and PO2 can have the same maximum power output level.

The switch circuit 120 is configured to selectively couple the output terminal TO1 to the output terminal TO2 according to a switch control signal CS0. In the present embodiment, the switch circuit 120 may include two switches SWA and SWB connected in series. Each of the switches SWA and SWB can be implemented using a load switch. By way of example but not limitation, each of the switches SWA and SWB can be implemented using a transistor switch such as an n-channel metal-oxide-semiconductor field-effect transistor (MOSFET) with drains connected together. Respective control terminals of the switches SWA and SWB, e.g. respective gates of the n-channel MOSFETs, are coupled to the switch control signal CS0. In some embodiments, the switch circuit 120 can be implemented using a single switch or a single load switch without departing from the scope of the present disclosure.

The power delivery control circuit 130, coupled to the USB port C1 and the USB port C2, is configured to generate the switch control signal CS0 according to connection information CI1 on the USB port C1 and connection information CI2 on the USB port C2. The connection information CI1 can indicate if any electronic device is attached to the USB port C1. When the connection information CI1 indicates that an electronic device is attached to the USB port C1, the USB port C1 serves as an attached charging port used to charge the electronic device. When the connection information CI1 indicates that no electronic device is attached to the USB port C1, the USB port C1 serves as a detached charging port which is detached from any electronic device. Similarly, the connection information CI2 can indicate whether the USB port C2 serves as an attached charging port or a detached charging port.

In the present embodiment, the power delivery control circuit 130 may include a plurality of port controllers 131 and 132. The port controller 131, coupled to the USB port C1, is configured to detect the USB port C1 to obtain the connection information CI1. The port controller 132, coupled to the USB port C2, is configured to detect the USB port C2 to obtain the connection information CI2. In addition, the port controllers 131 and 132 can be coupled to each other, such that one of the port controllers 131 and 132 can be configured to generate the switch control signal CS0 according to the connection information CI1 and the connection information CI2 by communicating with the other of the port controllers 131 and 132. For example, the port controller 131 can communicate with the port controller 132 to obtain the connection information CI2, and refer to the connection information CI1 and the connection information CI2 to generate the switch control signal CS0. As another example, the port controller 132 can communicate with the port controller 131 to obtain the connection information CI1, and refer to the connection information CI1 and the connection information CI2 to generate the switch control signal CS0. In some embodiments, the port controller 131 and the port controller 132 can be coupled to each other through an inter-integrated circuit ($I^2C$) bus. In some embodiments, the port controller 131 and the port controller 132 can be coupled to each other through general purpose input/output (GPIO) pins, which can be used to implement $I^2C$ communication.

Additionally, in the present embodiment, when the switch circuit 120 is configured to couple the output terminal TO1 to the output terminal TO2 according to the switch control signal CS0, one of the USB port C1 and the USB port C2 is coupled to each of the output terminal TO1 and the output terminal TO2, and the other of the USB port C1 and the USB port C2 is uncoupled from each of the output terminal TO1 and the output terminal TO2. By way of example but not limitation, the multi-port power delivery system 100 may further include a plurality of switches SW1 and SW2. The switch SW1, located in the power path P1 disposed between the output terminal TO1 and the USB port C1, can be controlled by the port controller 131 according to the connection information CI1. When the USB port C1 is an attached charging port, i.e. attached to an electronic device, the switch SW1 can be switched on to couple the output terminal TO1 to the USB port C1. When the USB port C1 is a detached charging port, i.e. detached from any electronic device, the switch SW1 can be switched off to uncouple the output terminal TO1 from the USB port C1. The switch SW2, located in the power path P2 disposed between the output terminal TO2 and the USB port C2, can be controlled by the port controller 132 according to the connection information CI2. When the USB port C2 is an attached charging port, the switch SW2 can be switched on to couple the output terminal TO2 to the USB port C2. When the USB port C2 is a detached charging port, the switch SW2 can be switched off to uncouple the output terminal TO2 from the USB port C2.

In operation, after the multi-port power delivery system 100 receives the power input PI supplied by the power source 102, the PSUs 111 and 112 can generate the power outputs PO1 and PO2 at the output terminals TO1 and TO2, respectively. The power delivery control circuit 130 can detect the USB port C1 and the USB port C2 to obtain the connection information CI1 and the connection information CI2, respectively. When the connection information CI1 and the connection information CI2 indicate that two electronic devices (not shown in FIG. 1) are attached to the USB ports C1 and C2, respectively, the power delivery control circuit 130 can generate the switch control signal CS0 for controlling the switch circuit 120 to uncouple the output terminal TO1 from the output terminal TO2. As a result, when the switch SW1 is switched on, the power output PO1 supplied by the PSU 111 can be delivered to the USB port C1 through the power path P1 to thereby charge an electronic device attached to the USB port C1. When the switch SW2 is switched on, the power output PO2 supplied by the PSU 112 can delivered to the USB port C2 through the power path P2 to thereby charge an electronic device attached to the USB port C2.

When the connection information CI1 and the connection information CI2 indicate that only one of the USB ports C1 and C2 is attached to an electronic device, the power delivery control circuit 130 can generate the switch control signal CS0 for controlling the switch circuit 120 to couple the output terminal TO1 to the output terminal TO2 and operations of the PSU 111 and the PSU 112 may further be synchronized. As a result, each of the power outputs PO1 and PO2 can be delivered to the same power path coupled to the one of the USB ports C1 and C2. For example, when the connection information CI1 and the connection information CI2 indicate that only the USB port C1 is attached to an electronic device, which requests for a power input greater than a maximum power output the PSU 111 can supply, the switch SW1 in the power path P1 is switched on, and the switch SW2 in the power path P2 is switched off. Each of the power outputs PO1 and PO2 can be delivered to the power path P1 to thereby charge the electronic device attached to the USB port C1. As another example, when the connection information CI1 and the connection information CI2 indicate that only the USB port C2 is attached to an electronic device, which requests for a power input greater than a maximum power output the PSU 112 can supply, the switch SW1 in the power path P1 is switched off, and the switch SW2 in the power path P2 is switched on. Each of the power outputs PO1 and PO2 can be delivered to the power path P2 to thereby charge the electronic device attached to the USB port C2.

It is worth noting that each of the PSU 111 and the PSU 112 can be designed to have a maximum power output less than a specified maximum total power output of the multi-port power delivery system 100. By way of example but not limitation, in some embodiments where the multi-port power delivery system 100 is designed to supply a predetermined maximum total power output of 60 watts, each of the PSU 111 and the PSU 112 can be designed to have a maximum power output of 30 watts, i.e. half the predetermined maximum total power output. When only the USB port C1 is attached to an electronic device, the USB port C1 still can provide a power output of 60 watts for the electronic device since each of the power output PO1 and the power output PO2 can be delivered to the USB port C1 through the power path P1. Compared with a dual-port USB charger utilizing one AC/DC converter and two DC/DC converters each having a maximum power output of 60 watts, the multi-port power delivery system 100 can supply a power output up to 60 watts with the use of the PSU 111 and the PSU 112 each having a maximum power output of 30 watts. As a result, the multi-port power delivery system 100 can increase overall system efficiency, reduce a circuit area and realize a cost-effective design.

The circuit topology shown in FIG. 1 is provided for illustrative purposes, and is not intended to limit the scope of the present disclosure. In some embodiments, when implemented as AC/DC converters, the PSU 111 and the PSU 112 can share a circuit block such as a front-end power factor correction (PFC) stage. In some embodiments where the USB port C1 can selectively receive power delivered thereto, the switch SW1 may be optional. In some embodiments where the USB port C2 can selectively receive power delivered thereto, the switch SW2 may be optional. In some embodiments, the multi-port power delivery system 100 may include more than two USB ports. As long as a single USB port can receive power supplied by more than one PSU in a multi-port power delivery system with the aid of a switch circuit disposed between respective output terminals of PSUs, associated modifications and alternatives fall within the contemplated scope of the present disclosure.

To facilitate understanding of the present disclosure, some embodiments associated with PSU circuit topology and control scheme thereof are given in the following for further description of the multi-port power delivery system. Those skilled in the art should appreciate that the multi-port power delivery system can be implemented using various circuit structures without departing from the scope of the present disclosure.

Figure 2:
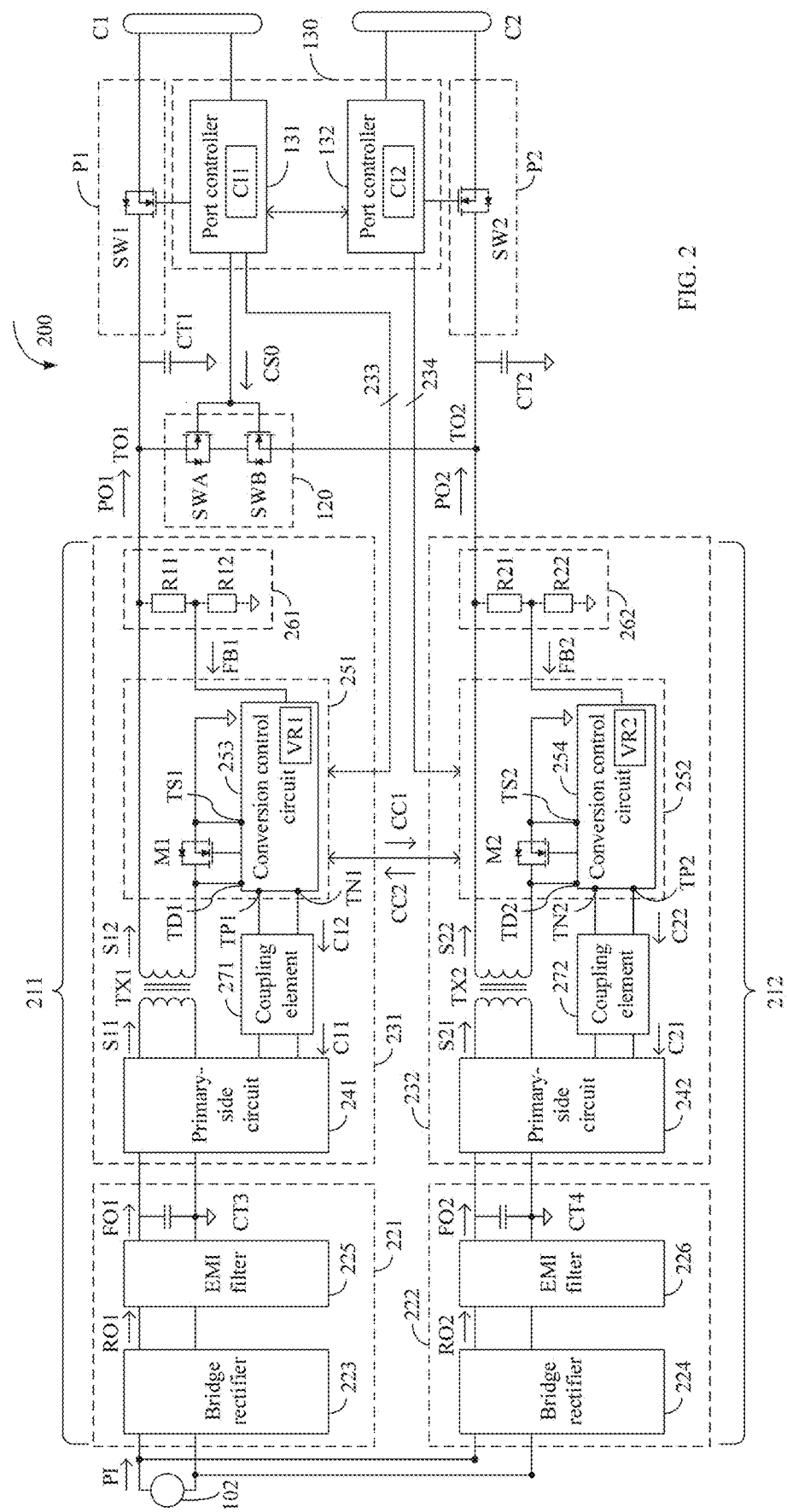
FIG. 2 illustrates an implementation of the multi-port power delivery system shown in FIG. 1 in accordance with some embodiments of the present disclosure.

FIG. 2 illustrates an implementation of the multi-port power delivery system 100 shown in FIG. 1 in accordance with some embodiments of the present disclosure. The circuit structure of the multi-port power delivery system 200 is similar/identical to the circuit structure of the multi-port power delivery system 100 shown in FIG. 1 except that each of the PSU 211 and the PSU 212 is implemented using a two-stage AC/DC converter. The PSU 211 and the PSU 212 can represent embodiments of the PSU 111 and the PSU 112 shown in FIG. 1, respectively.

In the present embodiment, the PSU 211 includes a plurality of power conversion units 221 and 231, wherein the power conversion unit 221 can serve as an AC/DC conversion stage for power factor correction (PFC), and the power conversion unit 231 can serve as a DC/DC conversion stage for output regulation. The power conversion unit 221 includes, but is not limited to, a bridge rectifier 223, an electromagnetic interference (EMI) filter 225 and an output capacitor CT3. The bridge rectifier 223 is configured to rectify the power input PI to generate a rectified output RO1. The EMI filter 225 is configured to perform EMI filtering upon the rectified output RO1 to generate a filtered output FO1. The output capacitor CT3 is configured to smooth ripples in the filtered output FO1.

The power conversion unit 231 includes, but is not limited to, a transformer TX1, a primary-side circuit 241, a secondary-side circuit 251, a feedback circuit 261 and a coupling element 271. The transformer TX1 is configured to convert a primary-side output S11 to a secondary-side input S12. The primary-side circuit 241, disposed in a primary side of the transformer TX1, is configured to receive the filtered output FO1 and generate the primary-side output S11 according to a control signal C11. The secondary-side circuit 251, disposed in a secondary side of the transformer TX1, is configured to receive the secondary-side input S12 to generate the power output PO1 at the output terminal TO1. The secondary-side circuit 251 is further configured to generate a control signal C12 according to a feedback signal FB1. The feedback circuit 261, coupled to the output terminal TO1 and the secondary-side circuit 251, is configured to generate the feedback signal FB1 according to the power output PO1. In the present embodiment, the feedback circuit 261 can be implemented as, but is not limited to, a voltage divider including a plurality of resistors R11 and R12. The coupling element 271, coupled between the primary-side circuit 241 and the secondary-side circuit 251, is configured to receive the control signal C12 to generate the control signal C11. By way of example but not limitation, the coupling element 271 can be implemented using at least one capacitor, at least one transformer, at least one piezoelectric element, at least one optical coupling element, or combinations thereof.

The PSU 212 includes a plurality of power conversion units 222 and 232, wherein the power conversion unit 222 can serve as an AC/DC conversion stage for PFC, and the power conversion unit 232 can serve as a DC/DC conversion stage for output regulation. The power conversion unit 222 includes, but is not limited to, a bridge rectifier 224, an electromagnetic interference (EMI) filter 226 and an output capacitor CT4. The bridge rectifier 224 is configured to rectify the power input PI to generate a rectified output RO2. The EMI filter 226 is configured to perform EMI filtering upon the rectified output RO2 to generate a filtered output FO2. The output capacitor CT4 is configured to smooth ripples in the filtered output FO2.

The power conversion unit 232 includes, but is not limited to, a transformer TX2, a primary-side circuit 242, a secondary-side circuit 252, a feedback circuit 262 and a coupling element 272. The transformer TX2 is configured to convert a primary-side output S21 to a secondary-side input S22. The primary-side circuit 242, disposed in a primary side of the transformer TX2, is configured to receive the filtered output FO2 and generate the primary-side output S21 according to a control signal C21. The secondary-side circuit 252, disposed in a secondary side of the transformer TX2, is configured to receive the secondary-side input S22 to generate the power output PO2 at the output terminal TO2. The secondary-side circuit 252 is further configured to generate a control signal C22 according to a feedback signal FB2. The feedback circuit 262, coupled to the output terminal TO2 and the secondary-side circuit 252, is configured to generate the feedback signal FB2 according to the power output PO2. In the present embodiment, the feedback circuit 262 can be implemented as, but is not limited to, a voltage divider including a plurality of resistors R21 and R22. The coupling element 272, coupled between the primary-side circuit 242 and the secondary-side circuit 252, is configured to receive the control signal C22 to generate the control signal C21. By way of example but not limitation, the coupling element 272 can be implemented using at least one capacitor, at least one transformer, at least one piezoelectric element, at least one optical coupling element, or combinations thereof.

When the switch circuit 120 is switched on to couple the output terminal TO1 to the output terminal TO2, the PSU 211 and the PSU 212 can be synchronized by the power delivery control circuit 130. For example, the secondary-side circuit 251 can be controlled by the port controller 131 through a bus 233, and the secondary-side circuit 252 can be controlled by the port controller 132 through a bus 234. Each of the bus 233 and the bus 234 may be implemented using an I²C bus. When the switch circuit 120 is configured to couple the output terminal TO1 to the output terminal TO2 according to the switch control signal CS0, the port controller 131 is configured to control the power conversion unit 231 to act as a master device, and the port controller 132 is configured to control the power conversion unit 232 to act as a slave device. The port controllers 131 and 132 can therefore serve as a master port controller and a slave port controller, respectively. In addition, the power conversion unit 231 can send a control signal CC1 to the power conversion unit 232, such that the power conversion unit 232 can be synchronized with the power conversion unit 231. Each of the power conversion unit 231 and the power conversion unit 232 can use the control signal CC1 to adjust a corresponding power output, i.e. the power output PO1 or the power output PO2. The PSU 211 and the PSU 212 can be synchronized accordingly.

It is worth noting that, in some embodiments, the power conversion units 231 and 232 can act as a master device and a slave device respectively when the switch circuit 120 is configured to couple the output terminal TO1 to the output terminal TO2. The port controllers 131 and 132 can therefore serve as a slave port controller and a master port controller, respectively. The power conversion unit 231 can be synchronized with the power conversion unit 232 according to a control signal CC2 sent from the power conversion unit 232. Each of the power conversion unit 231 and the power conversion unit 232 can use the control signal CC2 to adjust a corresponding power output, i.e. the power output PO1 or the power output PO2.

When the switch circuit 120 is configured to uncouple the output terminal TO1 from the output terminal TO2 according to the switch control signal CS0, the power conversion unit 231 will not send the control signal CC1 to the power conversion unit 232, and the power conversion unit 232 will not send the control signal CC2 to the power conversion unit 231, either. As a result, the PSUs 211 and 212 can operate independently.

By way of example but not limitation, the secondary-side circuit 251 may include a conversion control circuit 253 and a synchronous rectifier (SR) transistor M1. The conversion control circuit 253, coupled to the feedback circuit 261, is configured to generate the control signal CC1 by comparing the feedback signal FB1 with a reference signal VR1. In addition, the conversion control circuit 253 can be configured to control operation of the SR transistor M1 according to the feedback signal FB1 or a voltage difference between terminals TD1 and TS1. The terminals TD1 and TS1 can be respectively connected to drain and source terminals when the SR transistor M1 is implemented by a MOSFET. Similarly, the secondary-side circuit 252 may include a conversion control circuit 254 and an SR transistor M2. The conversion control circuit 254, coupled to the feedback circuit 262, is configured to generate the control signal CC2 by comparing the feedback signal FB2 with a reference signal VR2. The conversion control circuit 254 can be configured to control operation of the SR transistor M2 according to the feedback signal FB2 or a voltage difference between terminals TD2 and TS2. The terminals TD2 and TS2 can be respectively connected to drain and source terminals when the SR transistor M2 is implemented by a MOSFET.

When the switch circuit 120 is switched off according to the switch control signal CS0, the conversion control circuit 253 can output the control signal C12 from terminals TP1 and TN1 according to the control signal CC1, and accordingly adjust the power output PO1. The conversion control circuit 254 can output the control signal C22 from terminals TP2 and TN2 according to the control signal CC2, and accordingly adjust the power output PO2. When the switch circuit 120 is switched on according to the switch control signal CS0, the conversion control circuit 253 and the conversion control circuit 254 can be synchronized according to the control signal CC1 or the control signal CC2. For example, in some embodiments where the power conversion unit 231 and the power conversion unit 232 act as a master device and a slave device respectively, the conversion control circuit 253 can send the control signal CC1 to the conversion control circuit 254 when the switch circuit 120 is switched on. The conversion control circuit 253 can generate the control signal C12 according to the control signal CC1, and the conversion control circuit 254 can generate the control signal C22 according to the control signal CC1. In some embodiments where the power conversion unit 231 and the power conversion unit 232 act as a slave device and a master device respectively, the conversion control circuit 254 can send the control signal CC2 to the conversion control circuit 253 when the switch circuit 120 is switched on. The conversion control circuit 254 can generate the control signal C22 according to the control signal CC2, and the conversion control circuit 253 can generate the control signal C12 according to the control signal CC2.

Figure 3:
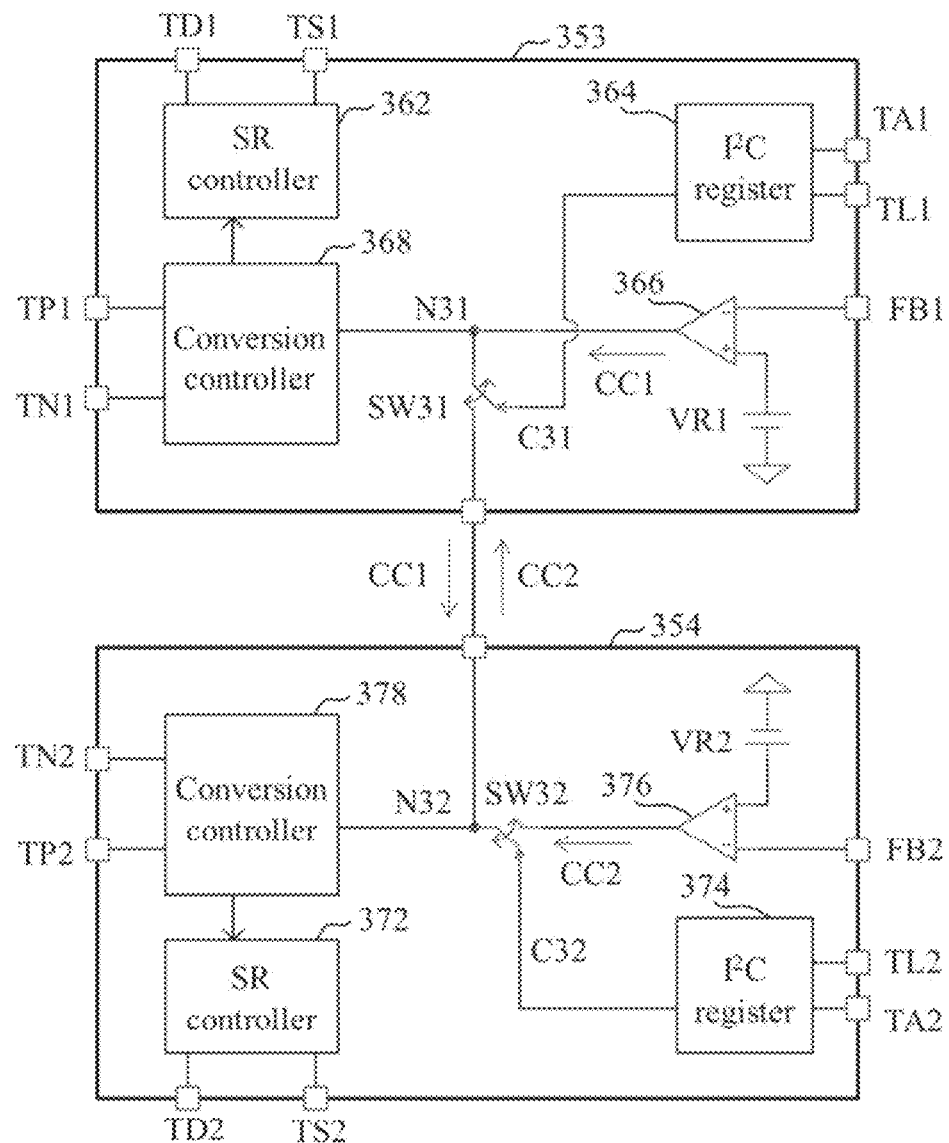
FIG. 3 illustrates implementations of the conversion control circuits shown in FIG. 2 in accordance with some embodiments of the present disclosure.

FIG. 3 illustrates implementations of the conversion control circuits 253 and 254 shown in FIG. 2 in accordance with some embodiments of the present disclosure. The conversion control circuit 353 and the conversion control circuit 354 can represent embodiments of the conversion control circuit 253 and the conversion control circuit 254 shown in FIG. 2, respectively. Referring to FIG. 3 and also to FIG. 2, the conversion control circuit 353 can be controlled by I²C commands sent from the port controller 131 via the bus 233, which can be implemented as an I²C bus including a serial data line (SDA) and a serial clock line (SCL) in the present embodiment. The conversion control circuit 353 may include, but is not limited to, an SR controller 362, an I²C register 364, a comparator 366, a conversion controller 368 and a switch SW31. The SR controller 362 is configured to control operation of the SR transistor M1. The I²C register 364 is coupled to the port controller 131 through terminals TA1 and TL1, which are connected to the SDA and the SCL of the bus 233. The I²C register 364 is configured to generate a control signal C31 according to an I²C command received from the terminals TA1 and TL1. The comparator 366 is configured to compare the feedback signal FB1 with the reference signal VR1 to generate the control signal CC1 at a node N31. The switch SW31 is selectively coupled between the node N31 and the conversion control circuit 354 according to the control signal C31.

The conversion controller 368, coupled to the node N31, is configured to receive the control signal CC1 to generate the control signal C12. It is worth noting that the secondary-side circuit 251 can adjust the power output PO1 according to the secondary-side input S12 which changes in response to the primary-side output S11, and that the primary-side circuit 241 can adjust the primary-side output S11 according to the control signal C11 which changes in responses to the control signal C12. As a result, the conversion controller 368 can adjust the control signal C12 according to the control signal CC1 to thereby adjust the power output PO1. By way of example but not limitation, the power conversion unit 231 can employ a constant on-time (COT) control scheme for output regulation, wherein the conversion controller 368 can be implemented using a COT controller. In other words, the conversion controller 368 can generate one or more pulses, each having a same pulse width, according to the control signal CC1, wherein the generated one or more pulses serve as the control signal C12 sent to the coupling element 271. Some examples of a COT control scheme are described in applicant's U.S. Pat. Nos. 9,954,455, 9,577,542, 9,548,667, 9,577,543 and 10,270,353, which are herein incorporated by reference.

The conversion control circuit 354 can be controlled by $I^2C$ commands sent from the port controller 132 via the bus 234, which can be implemented as an $I^2C$ bus including an SDA and an SCL in the present embodiment. The conversion control circuit 354 may include, but is not limited to, an SR controller 372, an $I^2C$ register 374, a comparator 376, a conversion controller 378 and a switch SW32. The SR controller 372 is configured to control operation of the SR transistor M2. The $I^2C$ register 374 is coupled to the port controller 132 through terminals TA2 and TL2, which are connected to the SDA and the SCL of the bus 234. The $I^2C$ register 374 is configured to generate a control signal C32 according to an $I^2C$ command received from the terminals TA2 and TL2. The comparator 376 is configured to compare the feedback signal FB2 with the reference signal VR2 to generate the control signal CC2. In the present embodiment, the reference signals VR2 and VR1 can have a same signal level. The switch SW32 can be selectively coupled between a node N32 and the comparator 376, wherein the node N32 is coupled to the conversion control circuit 353. The conversion controller 378, coupled to the node N32, is configured to receive one of the control signal CC1 and the control signal CC2 to generate the control signal C22. Similar to the conversion controller 368, the conversion controller 378 can adjust the control signal C22 to thereby adjust the power output PO2. In the present embodiment, the power conversion unit 232 can employ a COT control scheme for output regulation, wherein the conversion controller 378 can be implemented using a COT controller.

In operation, after the multi-port power delivery system 200 receives the power input PI supplied by the power source 102, the PSUs 211 and 212 can generate the power outputs PO1 and PO2 at the output terminals TO1 and TO2, respectively. The port controller 131 can detect the USB port C1 to obtain the connection information CI1, and the port controller 132 can detect the USB port C2 to obtain the connection information CI2. When the port controller 131 communicates with the port controller 132 to recognize that each of the USB ports C1 and C2 is attached to a corresponding electronic device, the port controller 131 can turn off the switch circuit 120 for uncoupling the output terminal TO1 from the output terminal TO2, and turn on the switch SW1 for coupling the output terminal TO1 to the USB port C1. In addition, the port controller 131 can control the $I^2C$ register 364 to turn off the switch SW31, such that the conversion control circuit 353 and the conversion control circuit 354 can operate independently. The port controller 132 can turn on the switch SW2 for coupling the output terminal TO1 to the USB port C2, and control the $I^2C$ register 374 to turn on the switch SW32. The conversion controller 378 can receive the control signal CC2 through the node N32 to adjust the power output PO2.

When the port controller 131 communicates with the port controller 132 to recognize that only the USB port C1 is attached to an electronic device, the port controller 131 can turn on the switch circuit 120 for coupling the output terminal TO1 to the output terminal TO2, and turn on the switch SW1 for coupling the output terminal TO1 to the USB port C1. In addition, the port controller 131 can control the $I^2C$ register 364 to turn on the switch SW31, such that the conversion control circuit 353 can send the control signal CC1 to the conversion control circuit 354. The port controller 132 can turn off the switch SW2 for uncoupling the output terminal TO2 from the USB port C2, and control the $I^2C$ register 374 to turn off the switch SW32. As a result, each of the conversion controllers 368 and 378 can receive the control signal CC1 to adjust a corresponding power output. The power conversion units 231 and 232 can act as a master device and a slave device synchronized with each other.

Similarly, when the port controller 131 communicates with the port controller 132 to recognize that only the USB port C2 is attached to an electronic device, the port controller 131 can turn on the switch circuit 120 and turn off the switch SW1. In addition, the port controller 131 can control the $I^2C$ register 364 to turn on the switch SW31, such that the conversion control circuit 353 can send the control signal CC1 to the conversion control circuit 354. The port controller 132 can turn on the switch SW2 for coupling the output terminal TO2 to the USB port C2, and control the $I^2C$ register 374 to turn off the switch SW32. As a result, each of the conversion controllers 368 and 378 can receive the control signal CC1 to adjust a corresponding power output.

Figure 4:
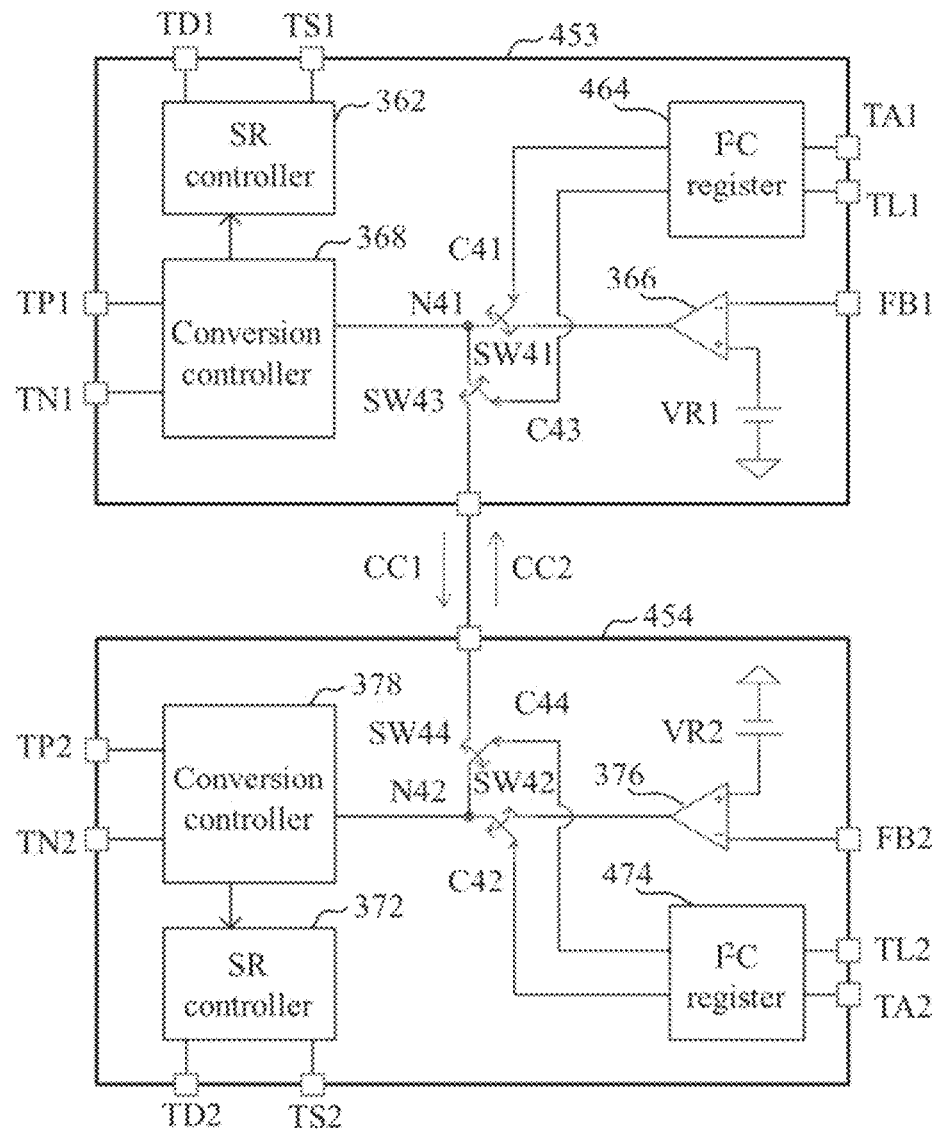
FIG. 4 illustrates implementations of the conversion control circuits shown in FIG. 2 in accordance with some embodiments of the present disclosure.

FIG. 4 illustrates other implementations of the conversion control circuits 253 and 254 shown in FIG. 2 in accordance with some embodiments of the present disclosure. The conversion control circuit 453 and the conversion control circuit 454 can represent embodiments of the conversion control circuit 253 and the conversion control circuit 254 shown in FIG. 2, respectively. The circuit topology shown in FIG. 4 is identical to the circuit topology shown in FIG. 3 except that each of the conversion control circuit 453 and the conversion control circuit 454 can have the same circuit structure. In the present embodiment, the conversion control circuit 453 may include the SR controller 362, the comparator 366 and the conversion controller 368 shown in FIG. 3, and further include an $I^2C$ register 464, a switch SW41 and a switch SW43. The $I^2C$ register 464 is configured to generate a control signal C41 and a control signal C43 according to an $I^2C$ command received from the terminals TA1 and TL1. The switch SW41 is selectively coupled between a node N41 and the comparator 366 according to the control signal C41. The switch SW43 is selectively coupled between the node N41 and the conversion control circuit 454 according to the control signal C43. In addition, the conversion control circuit 454 may include the SR controller 372, the comparator 376 and the conversion controller 378 shown in FIG. 3, and further include an $I^2C$ register 474, a switch SW42 and a switch SW44. The $I^2C$ register 474 is configured to generate a control signal C42 and a control signal C44 according to an $I^2C$ command received from the terminals TA2 and TL2. The switch SW42 is selectively coupled between a node N42 and the comparator 376 according to the control signal C42. The switch SW44 is selectively coupled between the node N42 and the conversion control circuit 453 according to the control signal C43.

Referring to FIG. 2 and FIG. 4, in operation, when the port controller 131 communicates with the port controller 132 to recognize that each of the USB ports C1 and C2 is attached to a corresponding electronic device, the port controller 131 can turn off the switch circuit 120 and turn on the switch SW1. In addition, the port controller 131 can control the I²C register 464 to turn on the switch SW41 and turn off the switch SW43. The port controller 132 can turn on the switch SW2, and control the I²C register 474 to turn on the switch SW42 and turn off the switch SW44. As a result, the conversion controller 368 can receive the control signal CC1 through the node N41 to adjust the power output PO1, and the conversion controller 378 can receive the control signal CC2 through the node N42 to adjust the power output PO2. The conversion control circuit 453 and the conversion control circuit 454 can operate independently When the port controller 131 communicates with the port controller 132 to recognize that only one of the USB ports C1 and C2 is attached to an electronic device, one of the power conversion units 231 and 232 can act as a master device to send a control signal for synchronization. For example, when only the USB port C1 is attached to an electronic device, the port controllers 131 and 132 can negotiate with each other to determine that the power conversion units 231 and 232 can act as a master device and a slave device respectively. As a result, the port controller 131 can control the I²C register 464 to turn on each of the switches SW41 and SW43, thereby sending the control signal CC1 to the conversion control circuit 454. The port controller 132 can control the I²C register 474 to turn off the switch SW42 and turn on the switch SW44, such that the conversion controller 378 can receive the control signal CC1 through the node N42 to adjust the power output PO2. As another example, when only the USB port C1 is attached to an electronic device, the port controllers 131 and 132 can negotiate with each other to determine that the power conversion units 231 and 232 can act as a slave device and a master device respectively. As a result, the port controller 132 can control the I²C register 474 to turn on each of the switches SW42 and SW44, thereby sending the control signal CC2 to the conversion control circuit 453. The port controller 131 can control the I²C register 464 to turn off the switch SW41 and turn on the switch SW43, such that the conversion controller 368 can receive the control signal CC2 through the node N41 to adjust the power output PO1.

It is worth noting that the circuit topologies shown in FIG. 3 and FIG. 4 are provided for illustrative purposes only, and are not intended to limit the scope of the present disclosure. For example, the conversion control circuit 253 can be implemented using other circuit structures capable of sending the control signal CC1 for synchronization without departing from the scope of the present disclosure. As another example, the conversion control circuit 254 can be implemented using other circuit structures capable of sending the control signal CC2 for synchronization without departing from the scope of the present disclosure.

Figure 5:
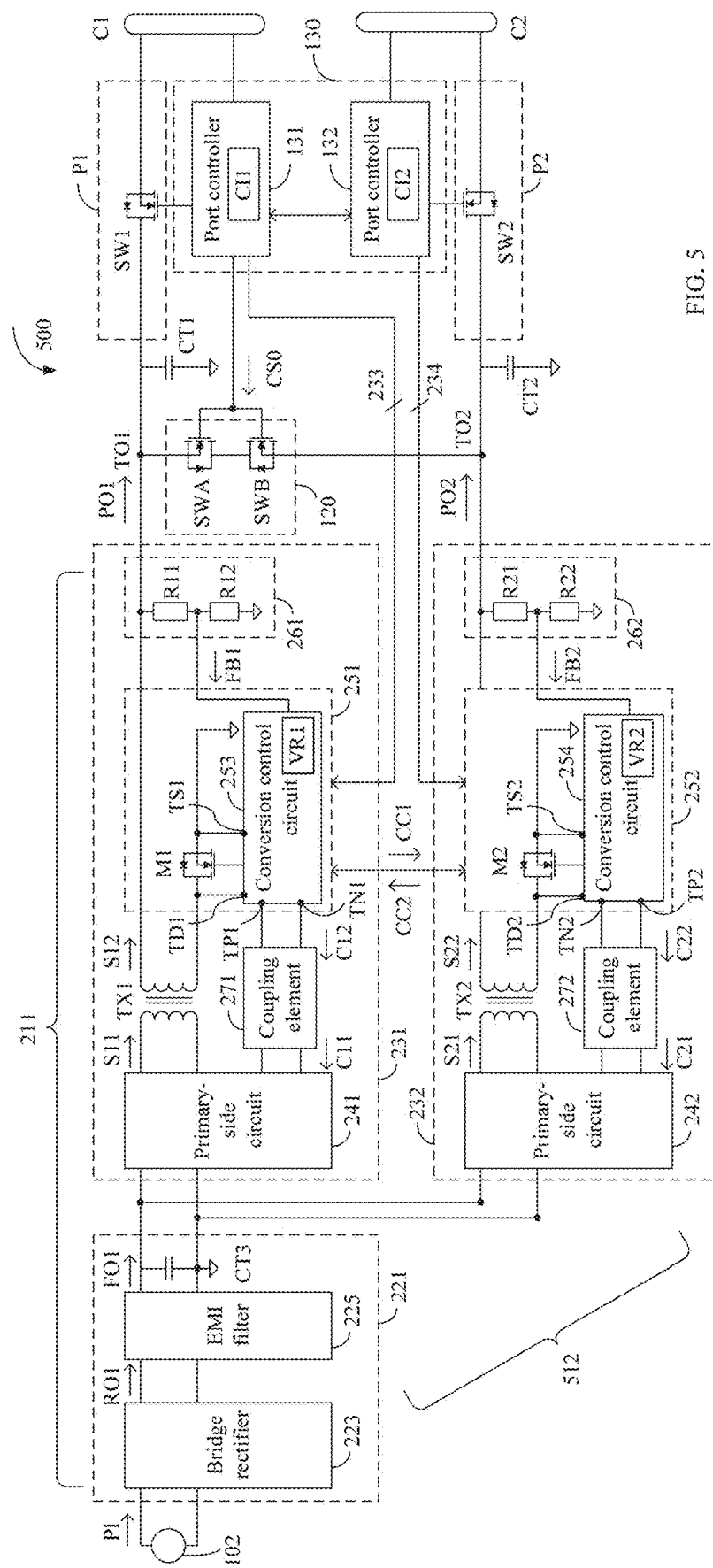
FIG. 5 illustrates another implementation of the multi-port power delivery system shown in FIG. 1 in accordance with some embodiments of the present disclosure.

Additionally, the circuit topology shown in FIG. 2 is provided for illustrative purposes, and is not intended to limit the scope of the present disclosure. FIG. 5 illustrates another implementation of the multi-port power delivery system 100 shown in FIG. 1 in accordance with some embodiments of the present disclosure. The circuit structure of the multi-port power delivery system 500 is similar/identical to the circuit structure of the multi-port power delivery system 200 shown in FIG. 2 except that the power conversion unit 221 is shared by the PSU 211 and the PSU 512, wherein the PSU 512 can represent an embodiment of the PSU 112 shown in FIG. 1. As those skilled in the art should understand the operation of the multi-port power delivery system 500 after reading the above paragraphs directed to FIG. 1 to FIG. 4, further description is omitted here for the sake of brevity.

Figure 6:
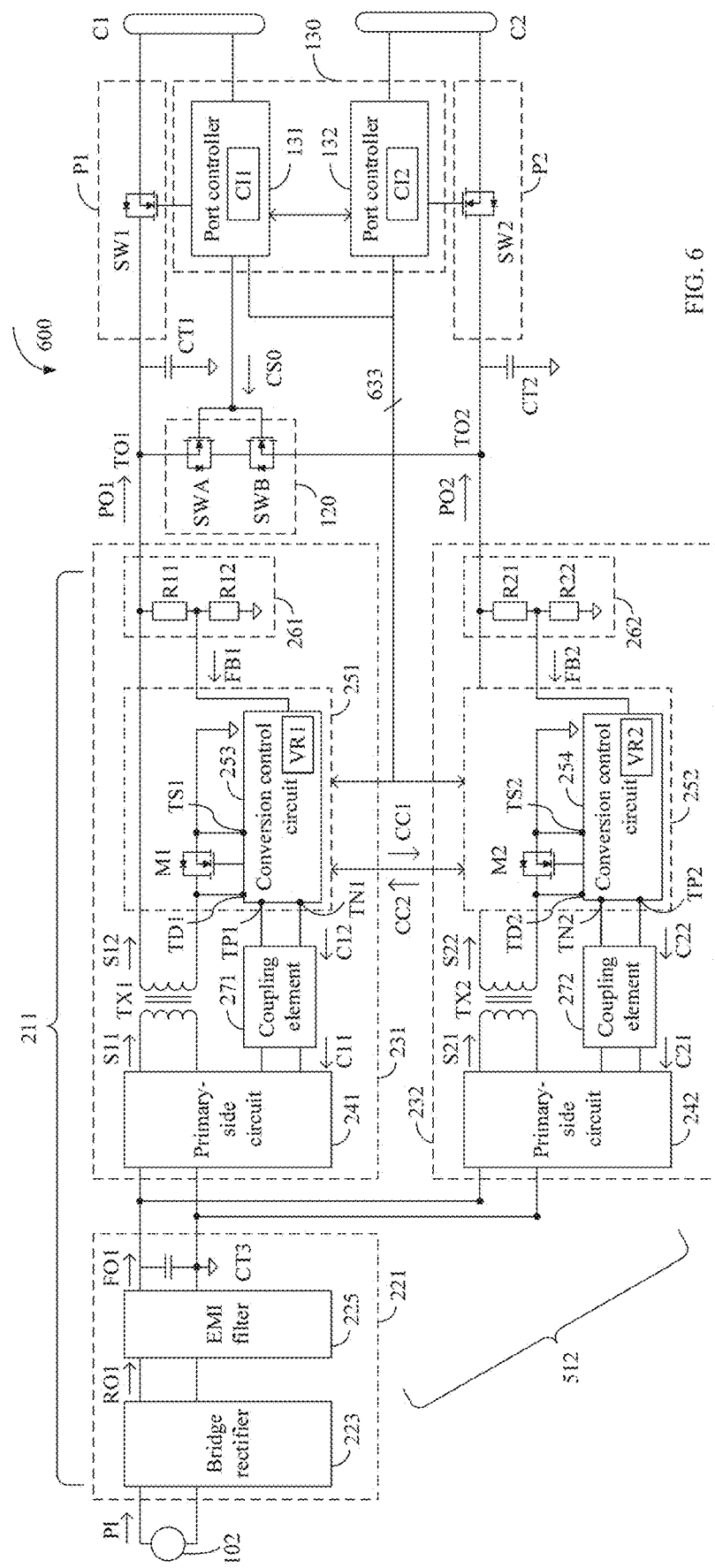
FIG. 6 illustrates another implementation of the multi-port power delivery system shown in FIG. 1 in accordance with some embodiments of the present disclosure.

FIG. 6 illustrates another implementation of the multi-port power delivery system 100 shown in FIG. 1 in accordance with some embodiments of the present disclosure. The circuit structure of the multi-port power delivery system 600 is similar/identical to the circuit structure of the multi-port power delivery system 500 shown in FIG. 5 except that the port controllers 131 and 132 can control the power conversion units 231 and 232 through a same bus 633, respectively. By way of example but not limitation, the port controller 131 can send a first I²C command to the bus 633, wherein the first I²C command can include an identifier of the power conversion units 231. The port controller 132 can send a second I²C command to the bus 633, wherein the second I²C command can include an identifier of the power conversion units 232. As a result, the power conversion units 231 can identify whether an I²C command on the bus 633 is the first I²C command sent from the port controller 131 or the second I²C command sent from the port controller 132 according to the identifier of the power conversion units 231. Similarly, the power conversion units 232 can identify whether the first I²C command or the second I²C command is sent from the port controller 132 according to the identifier of the power conversion units 232. As those skilled in the art should understand the operation of the multi-port power delivery system 600 after reading the above paragraphs directed to FIG. 1 to FIG. 5, further description is omitted here for the sake of brevity.

Figure 7:
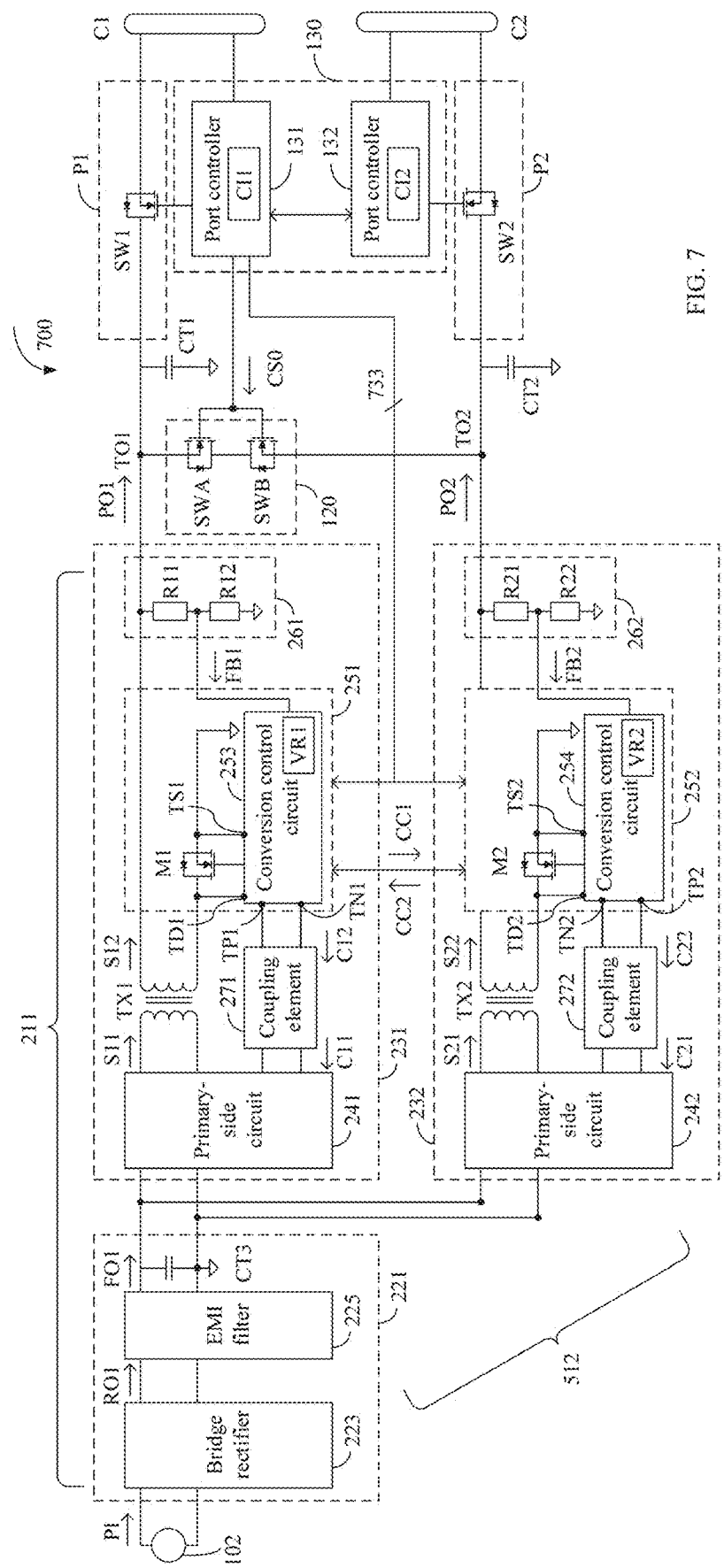
FIG. 7 illustrates another implementation of the multi-port power delivery system shown in FIG. 1 in accordance with some embodiments of the present disclosure.

FIG. 7 illustrates another implementation of the multi-port power delivery system 100 shown in FIG. 1 in accordance with some embodiments of the present disclosure. The circuit structure of the multi-port power delivery system 700 is similar/identical to the circuit structure of the multi-port power delivery system 500 shown in FIG. 5 except that each of the power conversion units 231 and 232 is controlled by the port controller 131 through a bus 733. By way of example but not limitation, when configured to control the power conversion unit 231, the port controller 131 can send an I²C command to the bus 733, wherein the I²C command can include an identifier of the power conversion unit 231. As another example, when configured to control the power conversion unit 232, the port controller 131 can send an I²C command to the bus 733, wherein the I²C command can include an identifier of the power conversion unit 232. As another example, when configured to control the power conversion units 231 and 232 concurrently, the port controller 131 can send I²C commands to the bus 733, wherein one of the I²C commands can include an identifier of the power conversion unit 231, and another of the I²C commands can include an identifier of the power conversion unit 232. As those skilled in the art should understand the operation of the multi-port power delivery system 700 after reading the above paragraphs directed to FIG. 1 to FIG. 6, further description is omitted here for the sake of brevity.

Figure 8:
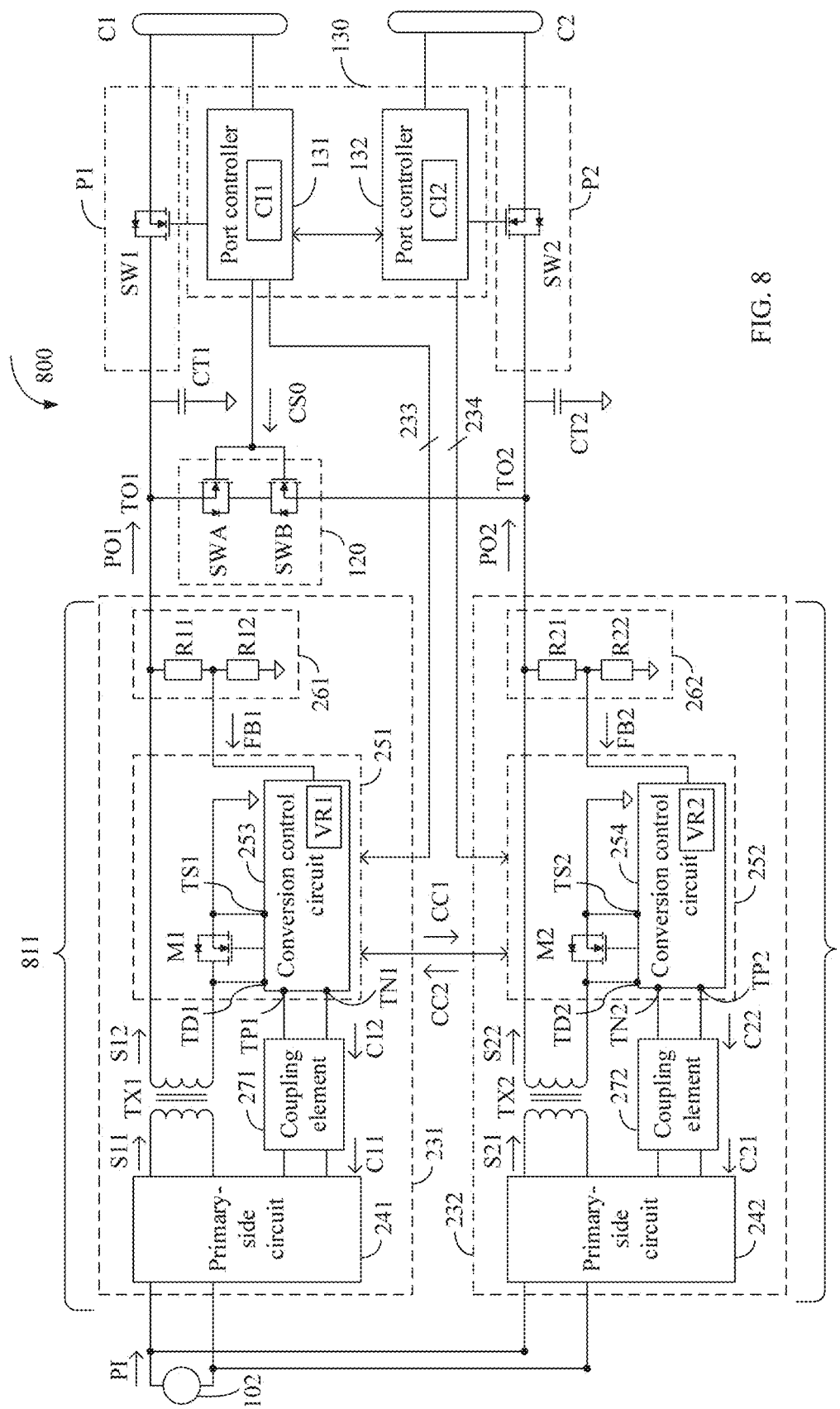
FIG. 8 illustrates another implementation of the multi-port power delivery system shown in FIG. 1 in accordance with some embodiments of the present disclosure.

FIG. 8 illustrates another implementation of the multi-port power delivery system 100 shown in FIG. 1 in accordance with some embodiments of the present disclosure. The circuit structure of the multi-port power delivery system 800 is similar/identical to the circuit structure of the multi-port power delivery system 200 shown in FIG. 2 except that each of the PSU 811 and the PSU 812 does not include an AC/DC conversion stage, e.g. the power conversion unit 221/222 shown in FIG. 2. As a result, the multi-port power delivery system 800 can be utilized to implement a multi-port DC/DC charger such as a multi-port car charger. As those skilled in the art should understand the operation of the multi-port power delivery system 800 after reading the above paragraphs directed to FIG. 1 to FIG. 7, further description is omitted here for the sake of brevity.

Figure 9:
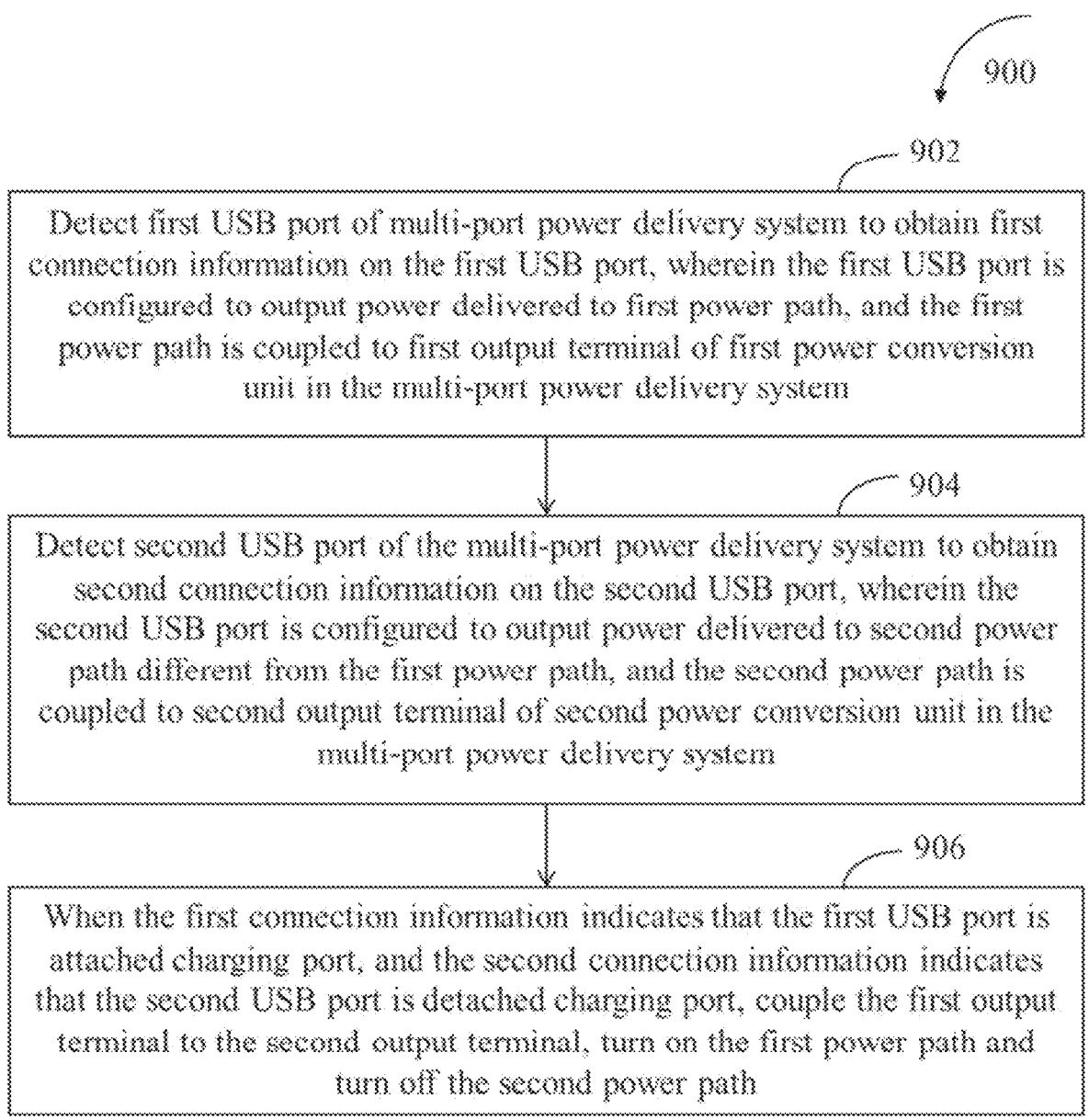
FIG. 9 is a flow chart of an exemplary control method of a multi-port power delivery system in accordance with some embodiments of the present disclosure.

FIG. 9 is a flow chart of an exemplary control method of a multi-port power delivery system in accordance with some embodiments of the present disclosure. The multi-port power delivery system includes a first USB port, a second USB port, a first power conversion unit and a second power conversion. The first USB port is configured to output power delivered to a first power path which is coupled to a first output terminal of the first power conversion unit. The second USB port is configured to output power delivered to a second power path which is coupled to a second output terminal of the second power conversion unit. For illustrative purposes, the control method 900 is described below with reference to the multi-port power delivery system 200 shown in FIG. 2. It is worth noting that the control method 900 can be employed in the multi-port power delivery system 100 shown in FIG. 1 without departing from the scope of the present disclosure. Additionally, in some embodiments, other operations in the control method 900 can be performed. In some embodiments, operations of the control method 900 can be performed in a different order and/or vary.

At operation 902, the first USB port is detected to obtain first connection information of the first USB port. For example, the port controller 131 may obtain the connection information CI1 by detecting the USB port C1 coupled to the power path P1, wherein the connection information CI1 can indicate if any electronic device is attached to the USB port C1.

At operation 904, the second USB port is detected to obtain second connection information of the second USB port. For example, the port controller 132 may obtain the connection information CI2 by detecting the USB port C2 coupled to the power path P2, wherein the connection information CI2 can indicate if any electronic device is attached to the USB port C2.

At operation 906, when the first connection information indicates that the first USB port is an attached charging port, and the second connection information indicates that the second USB port is a detached charging port, the first output terminal is coupled to the second output terminal. In addition, the first power path is turned on, while the second power path is turned off. For example, when the connection information CI1 indicates that an electronic device is attached to the USB port C1, and the connection information CI2 indicates that no electronic device is attached the USB port C2, the port controller 131 can recognize that the USB port C1 is an attached charging port, and the port controller 132 can recognize that the USB port C2 is a detached charging port. The port controller 131 can control the switch circuit 120 to couple the output terminal TO1 to the output terminal TO2. In addition, the port controller 131 can turn on the power path P1 by turning on the switch SW1, while the port controller 132 can turn off the power path P2 by turning off the switch SW2.

In some embodiments, when the first connection information indicates that the first USB port is an attached charging port, and the second connection information indicates that the second USB port is an attached charging port, the first output terminal is uncoupled from the second output terminal. Also, each of the first power path and the second power path is turned on. For example, when the port controller 131 recognizes that the USB port C1 is an attached charging port, and the port controller 132 recognizes that the USB port C2 is an attached charging port, the port controller 131 can control the switch circuit 120 to uncouple the output terminal TO1 from the output terminal TO2. In addition, the port controller 131 can turn on the switch SW1, and the port controller 132 can turn on the switch SW2. The power conversion units 231 and 232 can operate independently.

In some embodiments, when the first output terminal is coupled to the second output terminal, the first power conversion unit and the second power conversion unit can be synchronized. For example, when the switch circuit 120 is switched on to couple the output terminal TO1 and the output terminal TO2, the port controller 131 can control the secondary-side circuit 251 to send the control signal CC1 to the secondary-side circuit 252, such that the power conversion units 231 and 232 can be synchronized. As those skilled in the art should understand the control mechanism for synchronizing the power conversion units 231 and 232 after reading the above paragraphs directed to FIG. 1 to FIG. 8 similar description is not repeated for the sake of brevity.

Figure 10:
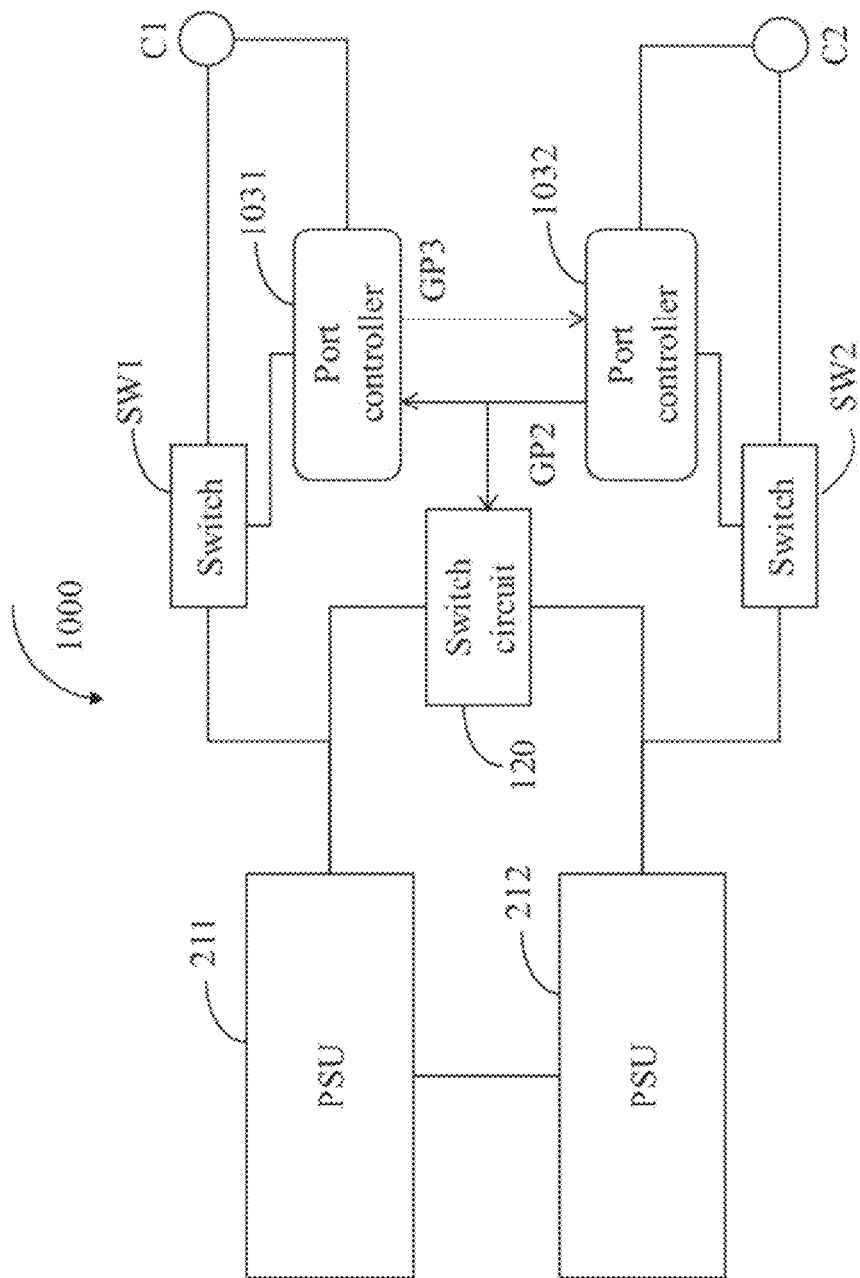
FIG. 10 illustrates an implementation of the multi-port power delivery system shown in FIG. 1 in accordance with some embodiments of the present disclosure.

In some embodiments, a slave port controller can be used to control the switch circuit 120 shown in FIG. 2. Referring to FIG. 10, an implementation of the multi-port power delivery system 100 shown in FIG. 1 is illustrated in accordance with some embodiments of the present disclosure. The circuit structure of the multi-port power delivery system 1000 is similar/identical to the circuit structure of the multi-port power delivery system 200 shown in FIG. 2 except that the switch circuit 120 is controlled by the port controller 1032 which is used to control the PSU 212. The port controllers 1031 and 1032 can represent embodiments of the port controllers 131 and 132 shown in FIG. 2, respectively. In the present embodiment, the port controllers 1031 and 1032 can act as a master port controller and a slave port controller, respectively. However, this is not meant to be a limitation of the present disclosure. In addition, the port controllers 1031 and 1032 can communicate with each other through control signals GP2 and GP3 transmitted therebetween. The control signal GP2 can be sent from a GPIO pin of the port controller 1032 to the port controller 1031, and the control signal GP3 can be sent from a GPIO pin of the port controller 1031 to the port controller 1032.

It is worth noting when a port controller acts as a master port controller, a PSU controlled by the port controller can operate in a master mode or an independent mode. When a port controller acts as a slave port controller, a PSU controlled by the slave controller can operate in a slave mode or an independent mode. By way of example but not limitation, the PSUs 211 and 212 can be implemented to include the conversion control circuits 453 and 454 shown in FIG. 4, respectively. In some embodiments where the port controller 1031 acts as a master port controller, the port controller 1031 can control the PSU 211 to operate in a master mode by turning on the switches SW41 and SW43 shown in FIG. 4, such that the control signal CC1 can be outputted to the conversion control circuit 454. Also, the port controller 1031 can control the PSU 211 to operate in an independent mode by turning on the switch SW41 and turning off the switch SW43 shown in FIG. 4. In some embodiments where the port controller 1032 acts as a slave port controller, the port controller 1032 can control the PSU 212 to operate in a slave mode by turning off the switch SW42 and turning on the switch SW43 shown in FIG. 4. As a result, when the conversion control circuit 453 sends the control signal CC1 for synchronization, the conversion control circuit 454 can receive the control signal CC1. In addition, the port controller 1032 can control the PSU 212 to operate in an independent mode by turning on the switch SW42 and turning off the switch SW44 shown in FIG. 4.

To facilitate understanding of operation of a master port controller and a slave port controller, some implementations of the control scheme employed by the port controllers 1031 and 1032 shown in FIG. 10 are given in the following in accordance with some embodiments. For illustrative purposes, the port controllers 1031 and 1032 can serve as a master port controller and a slave port controller, respectively, in the embodiments shown in FIG. 11 to FIG. 17. It is worth noting the control scheme shown in FIG. 11 to FIG. 17 can be employed in embodiments where the port controllers 131 and 132 shown in FIG. 1 serve as a master port controller and a slave port controller, respectively.

Figure 11:
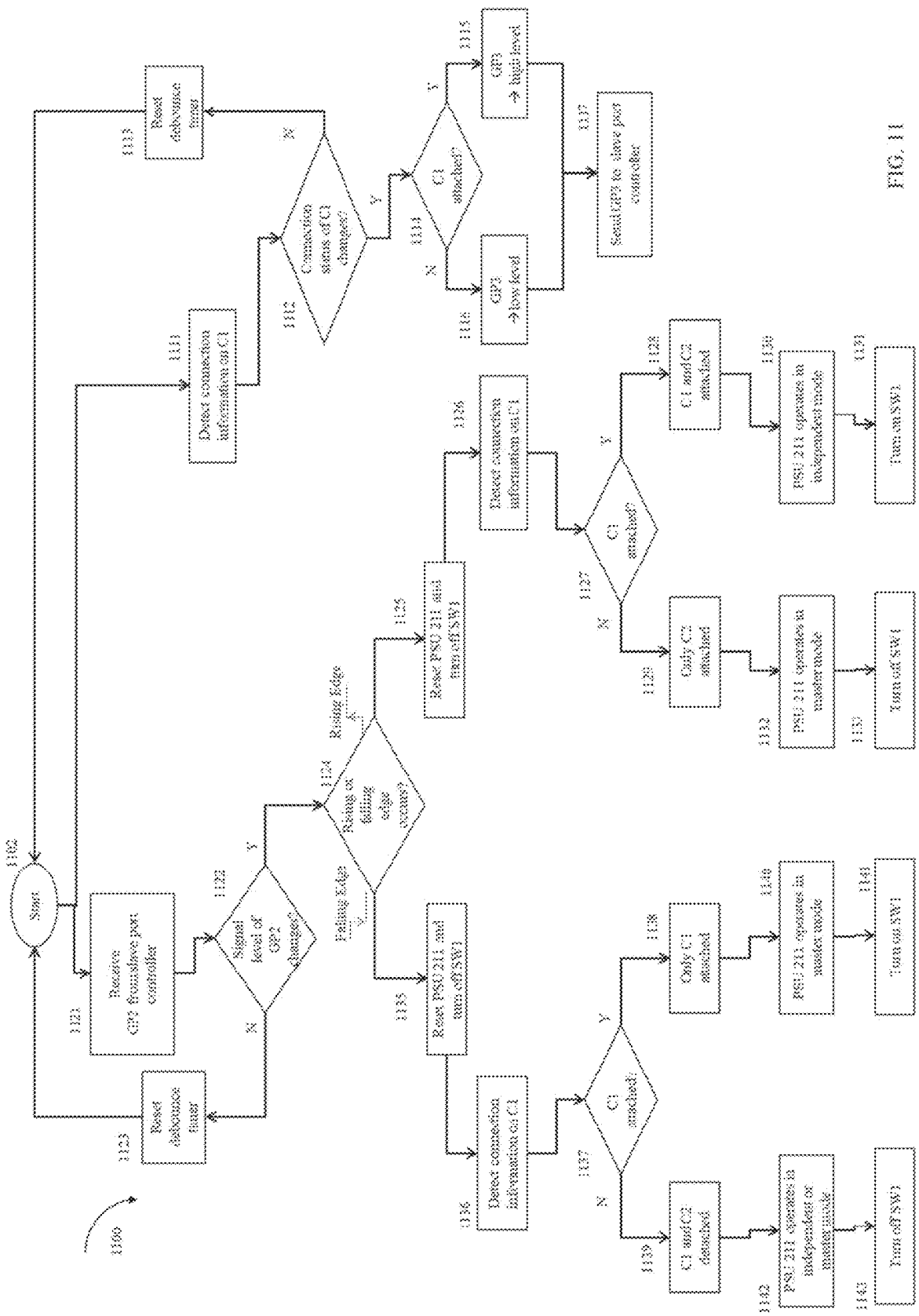
FIG. 11 is a flow chart of an exemplary control method of the port controller shown in FIG. 10 in accordance with some embodiments of the present disclosure.

FIG. 11 is a flow chart of an exemplary control method of the port controller 1031, serving as a master port controller, shown in FIG. 10 in accordance with some embodiments of the present disclosure. In some embodiments, the control method 1100 can be employed by a master port controller in a multi-port power delivery system, such as the port controller 131 shown in FIG. 1, without departing from the scope of the present disclosure. In some embodiments, the control method 1100 can be employed by the port controller 132 shown in FIG. 2 when the port controllers 132 and 131 acts as a master port controller and a slave port controller respectively. In some embodiments, other operations in the control method 1100 can be performed. In some embodiments, operations of the control method 1100 can be performed in a different order and/or vary.

Referring to FIG. 11 and also to FIG. 10, at operation 1102, the port controller 1031 may start a debounce timer. At operation 1111, the port controller 1031 may detect connection information on the USB port C1. At operation 1112, the port controller 1031 may detect if a connection status of the USB port C1 changes within a debounce time interval. If the connection status of the USB port C1 does not change during the debounce time interval, the flow proceeds to operation 1113. If the port controller 1031 detects that the connection status of the USB port C1 changes within the debounce time interval, the flow proceeds to operation 1114. At operation 1113, the port controller 1031 may reset the debounce timer.

At operation 1114, the port controller 1031 may detect if the USB port C1 is attached to any electronic device. If the port controller 1031 detects that the USB port C1 is attached to an electronic device, the flow proceeds to operation 1115. Otherwise, the flow proceeds to operation 1116. At operation 1115, the port controller 1031 may set a signal level of the control signal GP3 to a logic high level "1". At operation 1116, the port controller 1031 may set the signal level of the control signal GP3 to a logic low level "0". At operation 1117, the port controller 1031 may send the control signal GP3 to the port controller 1032.

At operation 1121, the port controller 1031 may receive the control signal GP2 from the port controller 1032. At operation 1122, the port controller 1031 may detect if a signal level of the control signal GP2 changes within the debounce time interval. If the signal level of the control signal GP2 does not change during the debounce time interval, the flow proceeds to operation 1123. If the port controller 1031 detects that the signal level of the control signal GP2 changes within the debounce time interval, the flow proceeds to operation 1124. At operation 1123, the port controller 1031 may reset the debounce timer. At operation 1124, the port controller 1031 may detect if a rising edge or a falling edge of the control signal GP2 occurs, thereby determining if the USB port C2 is attached to any electronic device. If the rising edge of the control signal GP2 is detected, the flow proceeds to operation 1125. If the falling edge of the control signal GP2 is detected, the flow proceeds to operation 1135.

At operation 1125, the port controller 1031 may reset the PSU 211 and turn off the switch SW1. At operation 1126, the port controller 1031 may detect the connection information on the USB port C1. At operation 1127, the port controller 1031 may detect if the USB port C1 is attached to any electronic device. If the port controller 1031 detects that the USB port C1 is attached to an electronic device, the flow proceeds to operation 1128. Otherwise, the flow proceeds to operation 1129. At operation 1128, the port controller 1031 may determine that each of the USB ports C1 and C2 is an attached charging port. At operation 1129, the port controller 1031 may determine that only the USB port C2 is an attached charging port. At operation 1130, the port controller 1031 may control the PSU 211 to operate in an independent mode. At operation 1131, the port controller 1031 may turn on the switch SW1. At operation 1132, the port controller 1031 may control the PSU 211 to operate in a master mode. At operation 1133, the port controller 1031 may turn off the switch SW1.

At operation 1135, the port controller 1031 may reset the PSU 211 and turn off the switch SW1. At operation 1136, the port controller 1031 may detect the connection information on the USB port C1. At operation 1137, the port controller 1031 may detect if the USB port C1 is attached to any electronic device. If the port controller 1031 detects that the USB port C1 is attached to an electronic device, the flow proceeds to operation 1138. Otherwise, the flow proceeds to operation 1139. At operation 1138, the port controller 1031 may determine that only the USB port C1 is an attached charging port. At operation 1139, the port controller 1031 may determine that each of the USB ports C1 and C2 is a detached charging port. At operation 1140, the port controller 1031 may control the PSU 211 to operate in a master mode. At operation 1141, the port controller 1031 may turn on the switch SW1. At operation 1142, the port controller 1031 may control the PSU 211 to operate in an independent mode or a master mode. At operation 1143, the port controller 1031 may turn off the switch SW1.

Figure 12:
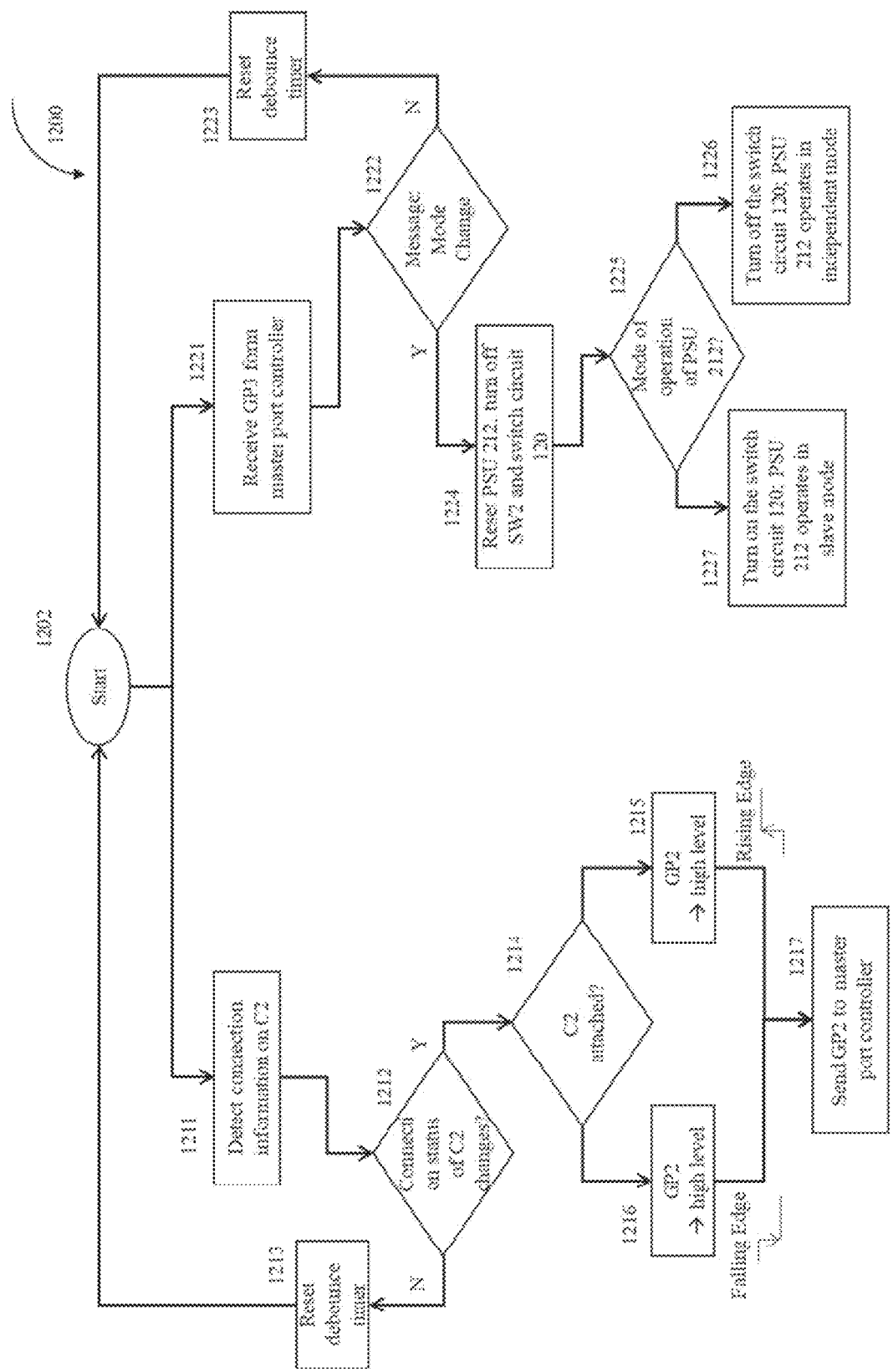
FIG. 12 is a flow chart of an exemplary control method of the port controller shown in FIG. 10 in accordance with some embodiments of the present disclosure.

FIG. 12 is a flow chart of an exemplary control method of the port controller 1032, serving as a slave port controller, shown in FIG. 10 in accordance with some embodiments of the present disclosure. In some embodiments, the control method 1200 can be employed by a slave port controller in a multi-port power delivery system, such as the port controller 132 shown in FIG. 1, without departing from the scope of the present disclosure. In some embodiments, the control method 1100 can be employed by the port controller 131 shown in FIG. 2 when the port controllers 132 and 131 acts as a master port controller and a slave port controller respectively. In some embodiments, other operations in the control method 1200 can be performed. In some embodiments, operations of the control method 1200 can be performed in a different order and/or vary.

Referring to FIG. 12 and also to FIG. 10, at operation 1202, the port controller 1032 may start a debounce timer. At operation 1211, the port controller 1032 may detect connection information on the USB port C2. At operation 1212, the port controller 1032 may detect if a connection status of the USB port C2 changes within a debounce time interval. If the connection status of the USB port C2 does not change during the debounce time interval, the flow proceeds to operation 1213. If the port controller 1032 detects that the connection status of the USB port C2 changes within the debounce time interval, the flow proceeds to operation 1214. At operation 1213, the port controller 1032 may reset the debounce timer.

At operation 1214, the port controller 1032 may detect if the USB port C2 is attached to any electronic device. If the port controller 1032 detects that the USB port C2 is attached to an electronic device, the flow proceeds to operation 1215. Otherwise, the flow proceeds to operation 1216. At operation 1215, the port controller 1032 may set a signal level of the control signal GP2 to a logic high level "1". At operation 1216, the port controller 1032 may set the signal level of the control signal GP2 to a logic low level "0". At operation 1217, the port controller 1032 may send the control signal GP2 to the port controller 1031.

At operation 1221, the port controller 1032 may receive the control signal GP3 from the port controller 1031. At operation 1222, the port controller 1032 may refer to the control signal GP3 to determine if the connection status of the USB port C1 changes within the debounce time interval, and refer to the control signal GP2 to determine if the connection status of the USB port C2 changes within the debounce time interval. If neither the connection status of the USB port C1 nor the connection status of the USB port C2 changes during the debounce time interval, the flow proceeds to operation 1223. If the connection status of the USB port C1 or the connection status of the USB port C2 changes during the debounce time interval, the flow proceeds to operation 1224. In some embodiments, the port controller 1032 may further update respective connection statuses of the USB ports C1 and C2 which can be stored in a register thereof. At operation 1223, the port controller 1032 may reset the debounce timer. At operation 1224, the port controller 1032 may reset the PSU 212, and turn off each of the switch SW2 and the switch circuit 120. At operation 1225, the port controller 1032 may refer to the control signals GP2 and GP3 to determine a mode of operation of the PSU 212. When respective signal levels of the control signals GP2 and GP3 correspond to a same logic level, the mode of operation of the PSU 212 will be an independent mode. The flow proceeds to operation 1226. When the respective signal levels of the control signals GP2 and GP3 correspond to different logic levels, the mode of operation of the PSU 212 will be a slave mode. The flow proceeds to operation 1227. At operation 1226, the port controller 1032 may turn off the switch circuit 120, and control the PSU 212 to operate in the independent mode. At operation 1227, the port controller 1032 may turn on the switch circuit 120, and control the PSU 212 to operate in the slave mode.

Figure 13:
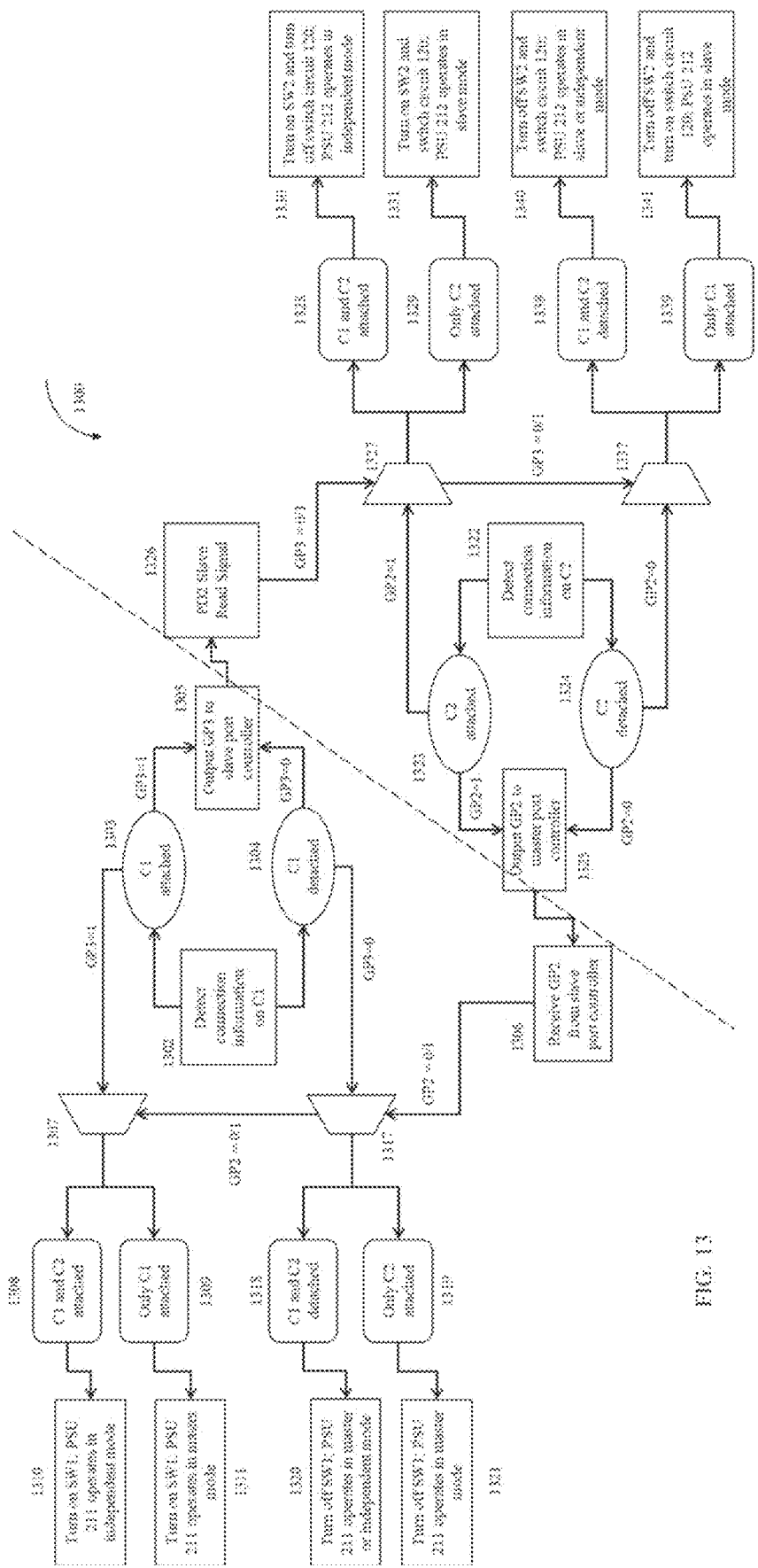
FIG. 13 is a flow chart of an exemplary control method of the port controllers shown in FIG. 10 in accordance with some embodiments of the present disclosure.

FIG. 13 is a flow chart of an exemplary control method of the port controllers 1031 and 1032, serving as a master port control and a slave port controller respectively, shown in FIG. 10 in accordance with some embodiments of the present disclosure. In some embodiments, the control method 1300 can be employed by a master port control and a slave port controller in a multi-port power delivery system, such as the port controllers 131 and 132 shown in FIG. 1, without departing from the scope of the present disclosure. In some embodiments, the control method 1300 can be employed by the port controllers 131 and 132 shown in FIG. 2 when the port controllers 131 and 132 acts as a slave port controller and a master port controller respectively. In some embodiments, other operations in the control method 1300 can be performed. In some embodiments, operations of the control method 1300 can be performed in a different order and/or vary.

Referring to FIG. 13 and also to FIG. 10, at operation 1302, the port controller 1031 may detect connection information on the USB port C1. At operation 1303, the port controller 1031 may detect that the USB port C1 is attached to an electronic device, and set the signal level of the control signal GP3 to the logic high level "1". At operation 1304, the port controller 1031 may detect that the USB port C1 is detached from any electronic device, and set the signal level of the control signal GP3 to the logic high level "0". At operation 1305, the port controller 1031 may output the control signal GP3 to the port controller 1032. At operation 1306, the port controller 1031 may receive the control signal GP2 from the port controller 1032.

At operation 1307, the port controller 1031 may refer to the control signal GP2 to determine a connection status of the USB port C2. If the control signal GP2 has the logic high level "1", the flow proceeds to operation 1308. If the control signal GP2 has the logic high level "0", the flow proceeds to operation 1309. At operation 1308, the port controller 1031 may determine that each of the USB ports C1 and C2 is an attached charging port. At operation 1309, the port controller 1031 may determine that only the USB port C1 is an attached charging port. At operation 1310, the port controller 1031 may turn on the switch SW1, and control the PSU 211 to operate in an independent mode. At operation 1311, the port controller 1031 may turn on the switch SW1, and control the PSU 211 to operate in a master mode.

At operation 1317, the port controller 1031 may refer to the control signal GP2 to determine the connection status of the USB port C2. If the control signal GP2 has the logic high level "0", the flow proceeds to operation 1318. If the control signal GP2 has the logic high level "1", the flow proceeds to operation 1319. At operation 1318, the port controller 1031 may determine that each of the USB ports C1 and C2 is a detached charging port. At operation 1319, the port controller 1031 may determine that only the USB port C2 is an attached charging port. At operation 1320, the port controller 1031 may turn off the switch SW1, and control the PSU 211 to operate in a master mode or an independent mode. At operation 1321, the port controller 1031 may turn off the switch SW1, and control the PSU 211 to operate in a master mode.

At operation 1322, the port controller 1032 may detect connection information on the USB port C2. At operation 1323, the port controller 1032 may detect that the USB port C2 is attached to an electronic device, and set the signal level of the control signal GP2 to the logic high level "1". At operation 1324, the port controller 1032 may detect that the USB port C2 is detached from any electronic device, and set the signal level of the control signal GP2 to the logic high level "0". At operation 1325, the port controller 1032 may output the control signal GP2 to the port controller 1031. At operation 1326, the port controller 1032 may receive the control signal GP3 from the port controller 1031.

At operation 1327, the port controller 1032 may refer to the control signal GP3 to determine a connection status of the USB port C1. If the control signal GP3 has the logic high level "1", the flow proceeds to operation 1328. If the control signal GP3 has the logic high level "0", the flow proceeds to operation 1329. At operation 1328, the port controller 1032 may determine that each of the USB ports C1 and C2 is an attached charging port. At operation 1329, the port controller 1032 may determine that only the USB port C2 is an attached charging port. At operation 1330, the port controller 1032 may turn on the switch SW2, turn off the switch circuit 120, and control the PSU 212 to operate in an independent mode. At operation 1331, the port controller 1032 may turn on the switch SW2 and the switch circuit 120, and control the PSU 212 to operate in a slave mode.

At operation 1337, the port controller 1032 may refer to the control signal GP3 to determine the connection status of the USB port C1. If the control signal GP3 has the logic high level "0", the flow proceeds to operation 1338. If the control signal GP3 has the logic high level "1", the flow proceeds to operation 1339. At operation 1338, the port controller 1032 may determine that each of the USB ports C1 and C2 is a detached charging port. At operation 1339, the port controller 1032 may determine that only the USB port C1 is an attached charging port. At operation 1340, the port controller 1032 may turn off the switch SW2 and the switch circuit 120, and control the PSU 212 to operate in a slave mode or an independent mode. At operation 1341, the port controller 1032 may turn off the switch SW2, and control the PSU 212 to operate in a slave mode. As those skilled in the art should understand the operation of the control method 1300 after reading the above paragraphs directed to FIG. 1 to FIG. 12, similar description is not repeated here for the sake of brevity.

Figure 14:
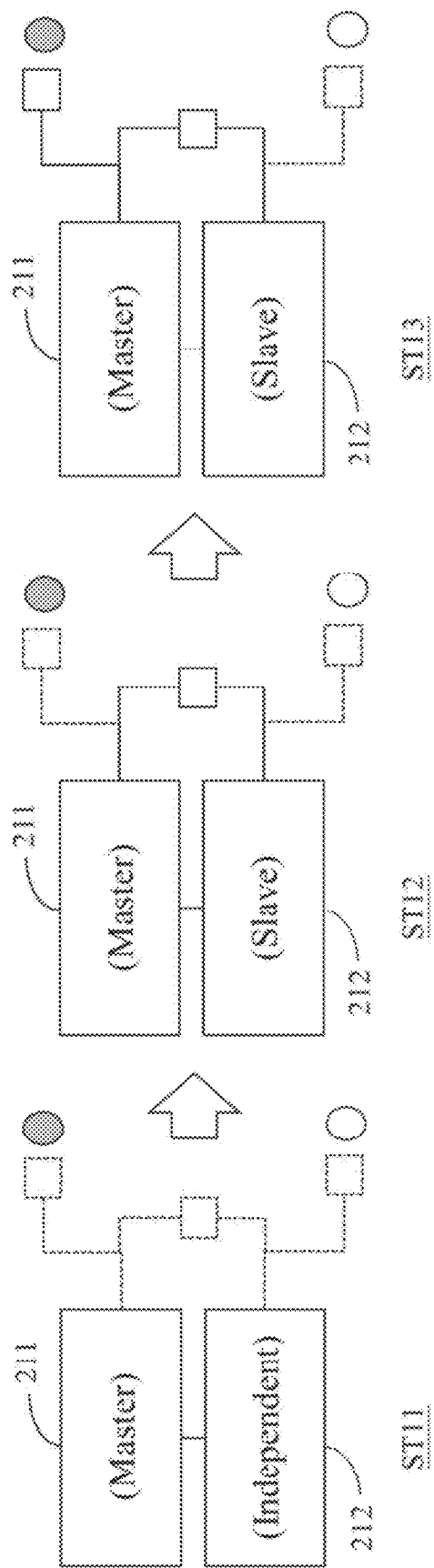
FIG. 14 is an operating diagram of the multi-port power delivery system shown in FIG. 10 in accordance with some embodiments of the present disclosure.

FIG. 14 is an operating diagram of the multi-port power delivery system 1000 shown in FIG. 10 in accordance with some embodiments of the present disclosure. Referring to FIG. 14 and also to FIG. 10, in an operating state ST11, the PSU 211 may operate in a master mode while the PSU 212 may operate in an independent mode. Additionally, the port controller 1031 may detect that an electronic device is attached to the USB port C1, and accordingly set the signal level of the control signal GP3 to the logic high level "1". An attached charging port, e.g. the USB port C1 in the present embodiment, can be presented by a solid circle. A detached charging port, e.g. the USB port C2 in the present embodiment, can be presented by an open circle. In an operating state ST12, the port controller 1032 may detect that the signal level of the control signal GP3 is set to the logic high level "1". As no electronic device is attached to the USB port C2, the port controller 1032 may set the signal level of the control signal GP2 to the logic low level "0". By referring to the control signals GP2 and GP3, the port controller 1032 may switch the PSU 212 from the independent mode to a slave mode, and turn on the switch circuit 120. In an operating state ST13, the port controller 1031 may turn on the switch SW1. For illustrative purposes, a dotted rectangle connected to a dotted line is used to represent the switch SW1, the switch SW2 or the switch circuit 120 is switched off. As those skilled in the art should understand the operation in the operating states ST11-ST13 after reading the above paragraphs directed to FIG. 1 to FIG. 13, further description is omitted here for the sake of brevity.

Figure 15:
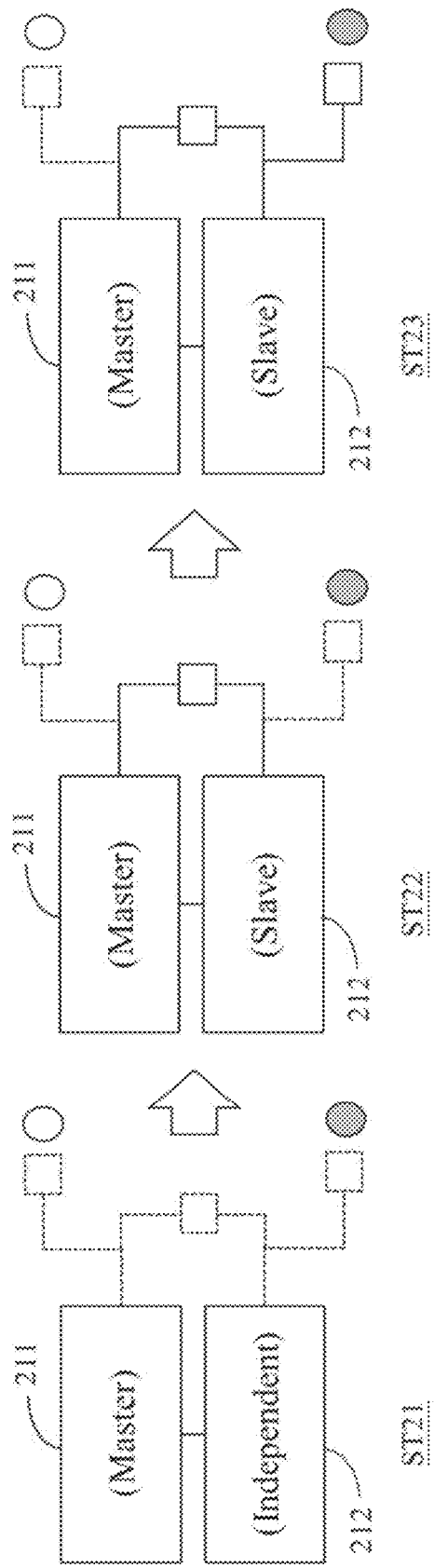
FIG. 15 is another operating diagram of the multi-port power delivery system shown in FIG. 10 in accordance with some embodiments of the present disclosure.

FIG. 15 is another operating diagram of the multi-port power delivery system 1000 shown in FIG. 10 in accordance with some embodiments of the present disclosure. Referring to FIG. 15 and also to FIG. 10, in an operating state ST21, the PSU 211 may operate in a master mode while the PSU 212 may operate in an independent mode. As no electronic device is attached to the USB port C1, the port controller 1031 may set the signal level of the control signal GP3 to the logic low level "0". In an operating state ST22, the port controller 1032 may detect that the signal level of the control signal GP3 is set to the logic high level "0". As the port controller 1032 detects that an electronic device is attached to the USB port C2, the port controller 1032 may set the signal level of the control signal GP2 to a logic low level "1". By referring to the control signals GP2 and GP3, the port controller 1032 may switch the PSU 212 from the independent mode to a slave mode, and turn on the switch circuit 120. In an operating state ST23, the port controller 1032 may turn on the switch SW2. As those skilled in the art should understand the operation in the operating states ST21-ST23 after reading the above paragraphs directed to FIG. 1 to FIG. 13, further description is omitted here for the sake of brevity.

Figure 16:
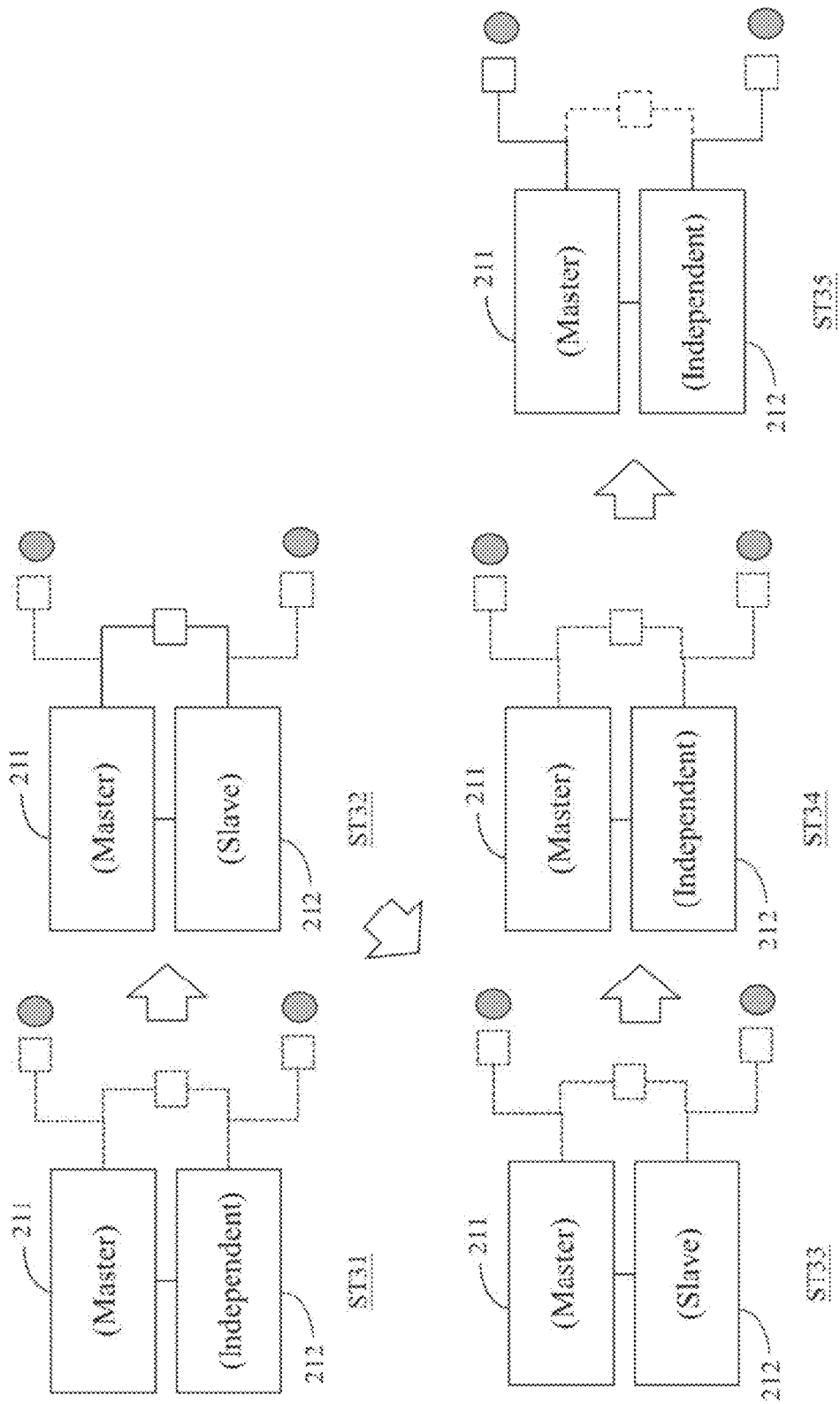
FIG. 16 is an operating diagram of the multi-port power delivery system shown in FIG. 10 in accordance with some embodiments of the present disclosure.

FIG. 16 is an operating diagram of the multi-port power delivery system 1000 shown in FIG. 10 in accordance with some embodiments of the present disclosure. Referring to FIG. 16 and also to FIG. 10, in an operating state ST31, the PSU 211 may operate in a master mode while the PSU 212 may operate in an independent mode. Additionally, the port controller 1031 may detect that an electronic device is attached to the USB port C1, and accordingly set the signal level of the control signal GP3 to the logic high level "1". In an operating state ST32, the port controller 1032 may receive the control signal GP3, and accordingly switch the PSU 212 from the independent mode to a slave mode and turn on the switch circuit 120. In an operating state ST33, the port controller 1032 may detect that an electronic device is attached to the USB port C2, and accordingly set the signal level of the control signal GP2 to the logic high level "1". Also, the port controller 1032 may refer to the control signals GP2 and GP3 to turn off the switch circuit 120. In an operating state ST34, the port controller 1032 may refer to the control signals GP2 and GP3 to switch the PSU 212 from the slave mode to the independent mode. In an operating state ST35, the port controller 1031 may turn on the switch SW1, and the port controller 1032 may turn on the switch SW2. As those skilled in the art should understand the operation in the operating states ST31-ST35 after reading the above paragraphs directed to FIG. 1 to FIG. 13, further description is omitted here for the sake of brevity.

Figure 17:
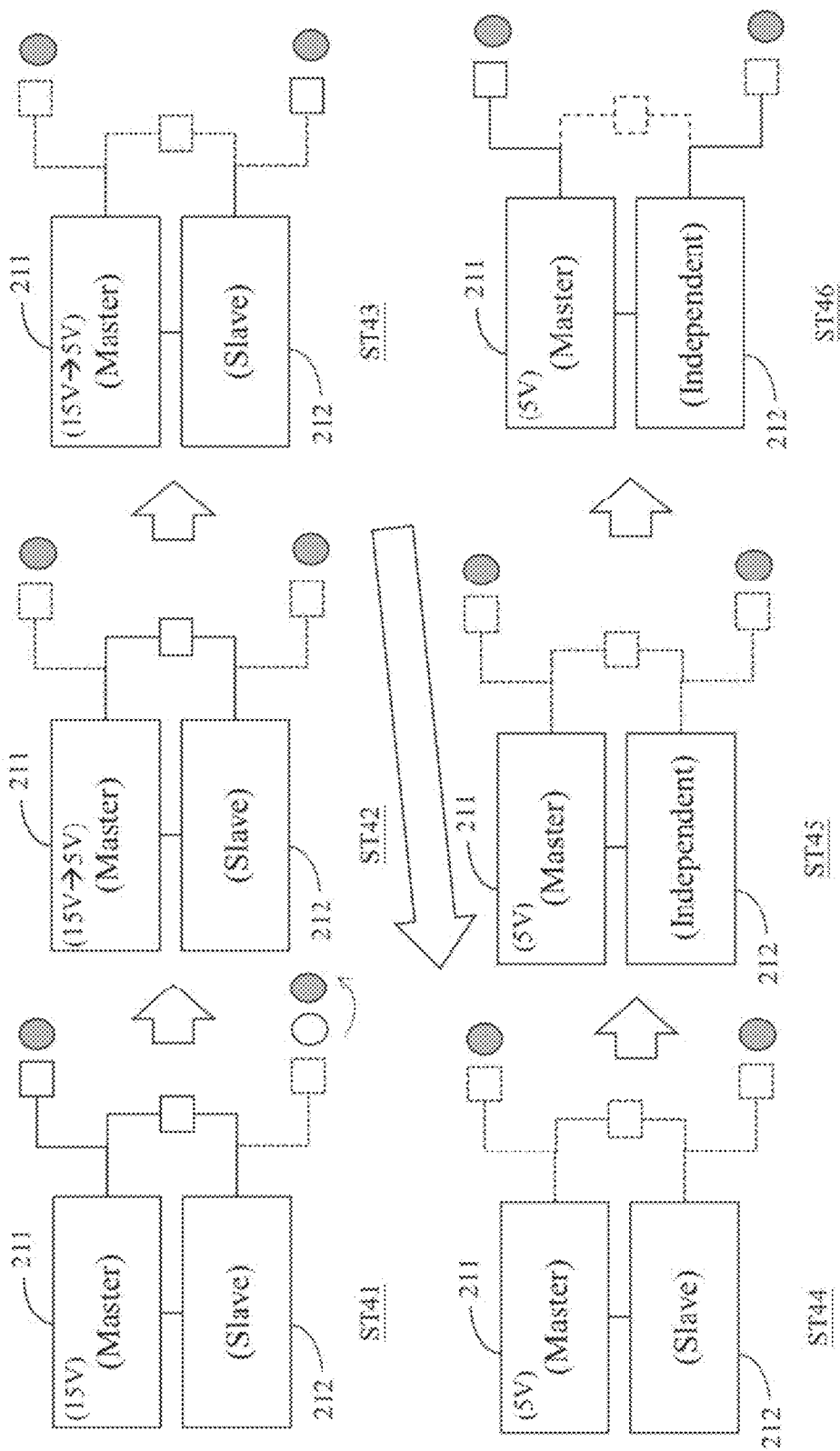
FIG. 17 is an operating diagram of the multi-port power delivery system shown in FIG. 10 in accordance with some embodiments of the present disclosure.

FIG. 17 is an operating diagram of the multi-port power delivery system 1000 shown in FIG. 10 in accordance with some embodiments of the present disclosure. Referring to FIG. 17 and also to FIG. 10, in an operating state ST41, the PSU 211 may operate in a master mode while the PSU 212 may operate in a slave mode. The USB port C1 is attached to an electronic device that requests for a power input greater than a maximum power output the PSU 211 can supply. By way of example but not limitation, the USB port C1 is configured to provide an output voltage of 15 volts to the electronic device. Next, when the port controller 1032 detects that another electronic device is attached to the USB port C2, the multi-port power delivery system 1000 may enter an operating state ST42. In the operating state, the port controller 1031 may negotiate with the port controller 1032 to turn off the switch SW1 and decrease the output voltage of the USB C1, for example, from 15 volts to 5 volts. In an operating state ST43, the port controller 1032 may refer to the control signals GP2 and GP3 to turn off the switch circuit 120. In an operating state ST44, the USB port C1 is configured to provide an output voltage of 5 volts to the electronic device. In an operating state ST45, the port controller 1032 may refer to the control signals GP2 and GP3 to switch the PSU 212 from the slave mode to the independent mode. In an operating state ST46, the port controller 1031 may turn on the switch SW1, and the port controller 1032 may turn on the switch SW2. As those skilled in the art should understand the operation in the operating states ST41-ST46 after reading the above paragraphs directed to FIG. 1 to FIG. 13, further description is omitted here for the sake of brevity.

With the aid of a switch circuit which can be controlled according to connection information on multiple USB ports, power supplied by more than one PSU can be delivered to a single port to provide a specified maximum total power output. A maximum power output of at least one PSU of a multi-port power delivery system can be less than the specified maximum total power output. The exemplary multi-port power delivery systems can therefore have increased overall system efficiency, a reduced occupied circuit area and a cost-effective design.

Those of ordinary skill in the art may recognize that modifications of the embodiments disclosed herein are possible. For example, a total number of the port controller may vary. Other modifications may occur to those of ordinary skill in this art, and all such modifications are deemed to fall within the purview of the present invention, as defined by the claims.

What is claimed is:

1. A multi-port power delivery system, comprising:
   a first universal serial bus (USB) port, configured to output power delivered through a first power path;
   a second USB port, configured to output power delivered through a second power path different from the first power path;
   a first power conversion unit, having a first output terminal coupled to the first power path;
   a second power conversion unit, having a second output terminal coupled to the second power path; and
   a switch circuit selectively coupling the first output terminal to the second output terminal according to a switch control signal;
   a power delivery control circuit, coupled to the first USB port, the second USB port and the switch circuit, the power delivery control circuit being configured to generate the switch control signal according to first connection information on the first USB port and second connection information on the second USB port;
   a first switch, located in the first power path, wherein when the first USB port is an attached charging port, the first switch is switched on to couple the first output terminal to the first USB port; when the first USB port is a detached charging port, the first switch is switched off to uncouple the first output terminal from the first USB port; and
   a second switch, located in the second power path, wherein when the second USB port is an attached charging port, the second switch is switched on to couple the second output terminal to the second USB port; when the second USB port is a detached charging port, the second switch is switched off to uncouple the second output terminal from the second USB port;
   wherein the switch circuit is different from the first switch;
   wherein the switch circuit is different from the second switch; and
   wherein the switch circuit comprises a third switch and a fourth switch connected in series.

2. The multi-port power delivery system of claim 1, wherein when the first connection information and the second connection information indicate that each of the first USB port and the second USB port is an attached charging port, the switch circuit is configured to uncouple the first output terminal from the second output terminal according to the switch control signal; when the first connection information and the second connection information indicate that one of the first USB port and the second USB port is an attached charging port, and that the other of the first USB port and the second USB port is a detached charging port, the switch circuit is configured to couple the first output terminal to the second output terminal according to the switch control signal.

3. The multi-port power delivery system of claim 1, wherein when the switch circuit is configured to couple the first output terminal to the second output terminal according to the switch control signal, one of the first USB port and the second USB port is coupled to each of the first output terminal and the second output terminal, and the other of the first USB port and the second USB port is uncoupled from each of the first output terminal and the second output terminal.

4. The multi-port power delivery system of claim 1, wherein when the switch circuit is configured to couple the first output terminal to the second output terminal according to the switch control signal, the power delivery control circuit is configured to synchronize the first power conversion unit and the second power conversion unit.

5. The multi-port power delivery system of claim 1, wherein the power delivery control circuit comprises:
   a first port controller, coupled to the first USB port, the first port controller being configured to detect the first USB port to obtain the first connection information; and
   a second port controller, coupled to the second USB port, the second port controller being configured to detect the second USB port to obtain the second connection information, wherein one of the first port controller and the second port controller is configured to generate the switch control signal according to the first connection information and the second connection information by communicating with the other of the first port controller and the second port controller.

6. The multi-port power delivery system of claim 5, wherein the one of the first port controller and the second port controller is further configured to control each of the first power conversion unit and the second power conversion unit.

7. The multi-port power delivery system of claim 1, wherein the first power conversion unit comprises:
   a first feedback circuit, coupled to the first output terminal, the first feedback circuit being configured to generate a first feedback signal according to a first power output generated at the first output terminal; and
   a first conversion control circuit, coupled to the first feedback circuit, the first conversion control circuit being configured to compare the first feedback signal with a first reference signal to generate a first control signal, and adjust the first power output according to the first control signal; and
   the second power conversion unit comprises:
   a second feedback circuit, coupled to the second output terminal, the second feedback circuit being configured to generate a second feedback signal according to a second power output generated at the second output terminal; and
   a second conversion control circuit, coupled to the first conversion control circuit and the second feedback circuit, the second conversion control circuit being configured to compare the second feedback signal with a second reference signal to generate a second control signal, and adjust the second power output according to one of the first control signal and the second control signal;
   wherein when the first output terminal is coupled to the second output terminal, the first conversion control circuit is configured to output the first control signal to the second conversion control circuit, and the second conversion control circuit is configured to adjust the second power output according to the first control signal; when the first output terminal is uncoupled from the second output terminal, the second conversion control circuit is configured to adjust the second power output according to the second control signal.

8. The multi-port power delivery system of claim 7, wherein the first conversion control circuit comprises:
- a comparator, coupled to a node, the comparator being configured to compare the first feedback signal with the first reference signal to generate the first control signal at the node;
- a conversion controller, coupled to the node, the conversion controller being configured to receive the first control signal to adjust the first power output; and
- a switch, selectively coupled between the node and the second conversion control circuit, wherein when the first output terminal is coupled to the second output terminal, the switch is switched on; when the first output terminal is uncoupled from the second output terminal, the switch is switched off.

9. The multi-port power delivery system of claim 7, wherein the first conversion control circuit comprises:
- a comparator, the comparator being configured to compare the first feedback signal with the first reference signal to generate the first control signal;
- a third switch, selectively coupled between a node and the comparator;
- a conversion controller, coupled to the node, the conversion controller being configured to receive the first control signal through the node to adjust the first power output; and
- a fourth switch, selectively coupled between the node to the second conversion control circuit;
- wherein when the first output terminal is coupled to the second output terminal, each of the third switch and the fourth switch is switched on; when the first output terminal is uncoupled from the second output terminal, the third switch is switched on, and the fourth switch is switched off.

10. The multi-port power delivery system of claim 7, wherein the second conversion control circuit comprises:
- a comparator, configured to compare the second feedback signal with the second reference signal to generate the second control signal;
- a switch, selectively coupled between a node and the comparator, the node being coupled to the first conversion control circuit;
- a conversion controller, coupled to the node, wherein when the first output terminal is coupled to the second output terminal, the switch is switched off, and the conversion controller is configured to receive the first control signal through the node to adjust the second power output; when the first output terminal is uncoupled from the second output terminal, the switch is switched on, and the conversion controller is configured to receive the second control signal to adjust the second power output.

11. The multi-port power delivery system of claim 7, wherein the second conversion control circuit comprises:
- a comparator, configured to compare the second feedback signal with the second reference signal to generate the second control signal;
- a third switch, selectively coupled between a node and the comparator;
- a fourth switch, selectively coupled between the node to the first conversion control circuit; and
- a conversion controller, coupled to the node, wherein when the first output terminal is coupled to the second output terminal, the third switch is switched off, the fourth switch is switched on, and the conversion controller is configured to receive the first control signal through the node to adjust the second power output; when the first output terminal is uncoupled from the second output terminal, the third switch is switched on, the fourth switch is switched off, and the conversion controller is configured to receive the second control signal to adjust the second power output.

12. The multi-port power delivery system of claim 1, wherein the first power conversion unit is configured to convert a direct-current (DC) power input to a first DC power output, and output the first DC power output from the first output terminal; the second power conversion unit is configured to convert the DC power input to a second DC power output, and output the second DC power output from the second output terminal; the multi-port power delivery system further comprises:
- a third power conversion unit, coupled to the first power conversion unit and the second power conversion unit, the third power conversion unit being configured to convert an alternating-current (AC) power input to the DC power input.

13. The multi-port power delivery system of claim 1, wherein the first power conversion unit is configured to convert a first DC power input to a first DC power output, and output the first DC power output from the first output terminal; the second power conversion unit is configured to convert a second DC power input to a second DC power output, and output the second DC power output from the second output terminal; the multi-port power delivery system further comprises:
- a third power conversion unit, coupled to the first power conversion unit, the third power conversion unit being configured to convert a first AC power input to the first DC power input; and
- a fourth power conversion unit, coupled to the second power conversion unit, the fourth power conversion unit being configured to convert a second AC power input to the second DC power input.

14. The multi-port power delivery system of claim 1, wherein each of the first USB port and the second USB port is a USB Type-C port.

15. A control method of a multi-port power delivery system, the control method comprising:
- detecting a first universal serial bus (USB) port of the multi-port power delivery system to obtain first connection information on the first USB port, the first USB port being configured to output power delivered through a first power path, the first power path being coupled to a first output terminal of a first power conversion unit in the multi-port power delivery system;
- detecting a second USB port of the multi-port power delivery system to obtain second connection information on the second USB port, the second USB port being configured to output power delivered through a second power path different from the first power path, the second power path being coupled to a second output terminal of a second power conversion unit in the multi-port power delivery system; and
- when the first connection information indicates that the first USB port is an attached charging port, and the second connection information indicates that the second USB port is a detached charging port, coupling the first output terminal to the second output terminal by a switch circuit, turning on the first power path by a first switch and turning off the second power path by a second switch;

when the first connection information indicates that the first USB port is the attached charging port, and the second connection information indicates that the second USB port is an attached charging port, uncoupling the first output terminal from the second output terminal, and turning on each of the first power path and the second power path;

wherein the switch circuit is different from the first switch;

wherein the switch circuit is different from the second switch; and wherein the switch circuit comprises a third switch and a fourth switch connected in series.

16. The control method of claim 15, further comprising:
when the first output terminal is coupled to the second output terminal, synchronizing the first power conversion unit and the second power conversion unit.

17. The control method of claim 15, wherein the first power conversion unit is configured to generate a first power output at the first output terminal; the second power conversion unit is configured to generate a second power output at the second output terminal; the control method further comprises:

generating a first feedback signal according to the first power output;

comparing the first feedback signal with a first reference signal to generate a first control signal; and when the first output terminal is coupled to the second output terminal, utilizing the first control signal to adjust each of the first power output and the second power output.

18. The control method of claim 17, further comprising:
generating a second feedback signal according to the second power output;

comparing the second feedback signal with a second reference signal to generate a second control signal; and when the first output terminal is uncoupled from the second output terminal, utilizing the first control signal to adjust the first power output, and utilizing the second control signal to adjust the second power output.

* * * * *